(12) United States Patent
Yasuda et al.

(10) Patent No.: US 9,100,185 B2
(45) Date of Patent: Aug. 4, 2015

(54) ENCRYPTION PROCESSING APPARATUS AND METHOD

(71) Applicant: FUJITSU LIMITED, Kawasaki-shi, Kanagawa (JP)

(72) Inventors: Masaya Yasuda, Kawasaki (JP); Takeshi Shimoyama, Shinagawa (JP); Jun Kogure, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 14/104,758

(22) Filed: Dec. 12, 2013

(65) Prior Publication Data

US 2014/0185794 A1 Jul. 3, 2014

(30) Foreign Application Priority Data

Dec. 27, 2012 (JP) ................................. 2012-286251

(51) Int. Cl.
| | | |
|---|---|---|
| *H04L 9/28* | (2006.01) | |
| *G06F 21/32* | (2013.01) | |
| *H04L 9/00* | (2006.01) | |
| *H04L 9/08* | (2006.01) | |

(52) U.S. Cl.
CPC ........ *H04L 9/28* (2013.01); *G06F 21/32* (2013.01); *H04L 9/008* (2013.01); *H04L 9/08* (2013.01)

(58) Field of Classification Search
None
See application file for complete search history.

(56) References Cited

U.S. PATENT DOCUMENTS

| | | | |
|---|---|---|---|
| 2010/0246812 A1 | 9/2010 | Rane et al. | |
| 2010/0329448 A1* | 12/2010 | Rane et al. | 380/28 |
| 2011/0026781 A1* | 2/2011 | Osadchy et al. | 382/118 |
| 2011/0099385 A1 | 4/2011 | Takahashi | |
| 2011/0135096 A1 | 6/2011 | Rane et al. | |
| 2011/0176672 A1 | 7/2011 | Rane et al. | |
| 2012/0207299 A1* | 8/2012 | Hattori et al. | 380/30 |
| 2013/0114811 A1* | 5/2013 | Boufounos et al. | 380/255 |
| 2014/0105385 A1* | 4/2014 | Rane et al. | 380/30 |
| 2014/0281567 A1* | 9/2014 | Rane et al. | 713/186 |

FOREIGN PATENT DOCUMENTS

| | | |
|---|---|---|
| JP | 2008-521025 | 6/2008 |
| JP | 2010-237653 | 10/2010 |
| JP | 2011-13672 | 1/2011 |
| JP | 2011-90539 | 5/2011 |
| JP | 2011-118387 | 6/2011 |
| JP | 2011-145512 | 7/2011 |
| WO | 2006/054208 | 5/2006 |

OTHER PUBLICATIONS

Craig Gentry, "Fully Homomorphic Encryption Using Ideal Lattices", STOC 2009, ACM Press, pp. 169-178, May 31-Jun. 2, 2009.

(Continued)

*Primary Examiner* — Michael R Vaughan
(74) *Attorney, Agent, or Firm* — Fujitsu Patent Center

(57) ABSTRACT

A device that uses homomorphic encryption is disclosed. The device obtains a first encrypted polynomial, a second encrypted polynomial, a first encrypted weight, and a second encrypted weight by respectively encrypting a first polynomial, a second polynomial, a first weight, and a second weight by using a homomorphic encryption scheme, and obtains an encrypted secure distance corresponding to encryption of a secure distance.

16 Claims, 13 Drawing Sheets

(56) References Cited

OTHER PUBLICATIONS

Craig Gentry et al., "Implementing Gentry's Fully-Homomorphic Encryption Scheme", Lecture Notes in Computer Science vol. 6632, pp. 129-148 (pp. 1-30), Aug. 5, 2010.

Masaya Yasuda et al., "Secret totalization of purchase histories of companies in cloud", The 29th Symposium on Cryptography and Information Security, Jan. 30-Feb. 2, 2012. Partial translation of Outline at p. 1 and Table 4 at p. 4.

Extended European Search Report issued on Apr. 7, 2014 for the corresponding European patent application No. 13197688.8, 6 pages.

Yasuda, Masaya et al., Guo Chengan Cguodeltalut Edu CN Dalian University of Technology School of Information and Communication Engine: "Analysis of Lattice Reduction Attack against the Somewhat Homomorphic Encryption Based on Ideal Lattices", Sep. 13, 2012, The Semantic Web—ISWC 2004; [Lecture Notes in Computer Science], Springer Berlin Heidelberg, pp. 1-16, XP047037754.

Gentry, Craig et al., "Implementing Gentry's Fully-Homomorphic Encryption Scheme", Feb. 4, 2011, pp. 1-29, XP055030189, Retrieved from the Internet: URL:http://researcher.watson.ibm.com/researcher/files/us-shaih/fhe-implementation.pdf, [retrieved on Jun. 18, 2012].

Yasuda, Masaya et al., Guo Chengan Cguodeltalut Edu CN Dalian University of Technology School of Information and Communication Engine: "Packed Homomorphic Encryption Based on Ideal Lattices and Its Application to Biometrics", Sep. 2, 2013, The Semantic Web—ISWC 2004; [Lecture Notes in Computer Science], Springer Berlin Heidelberg, pp. 55-74, XP047037853.

* cited by examiner

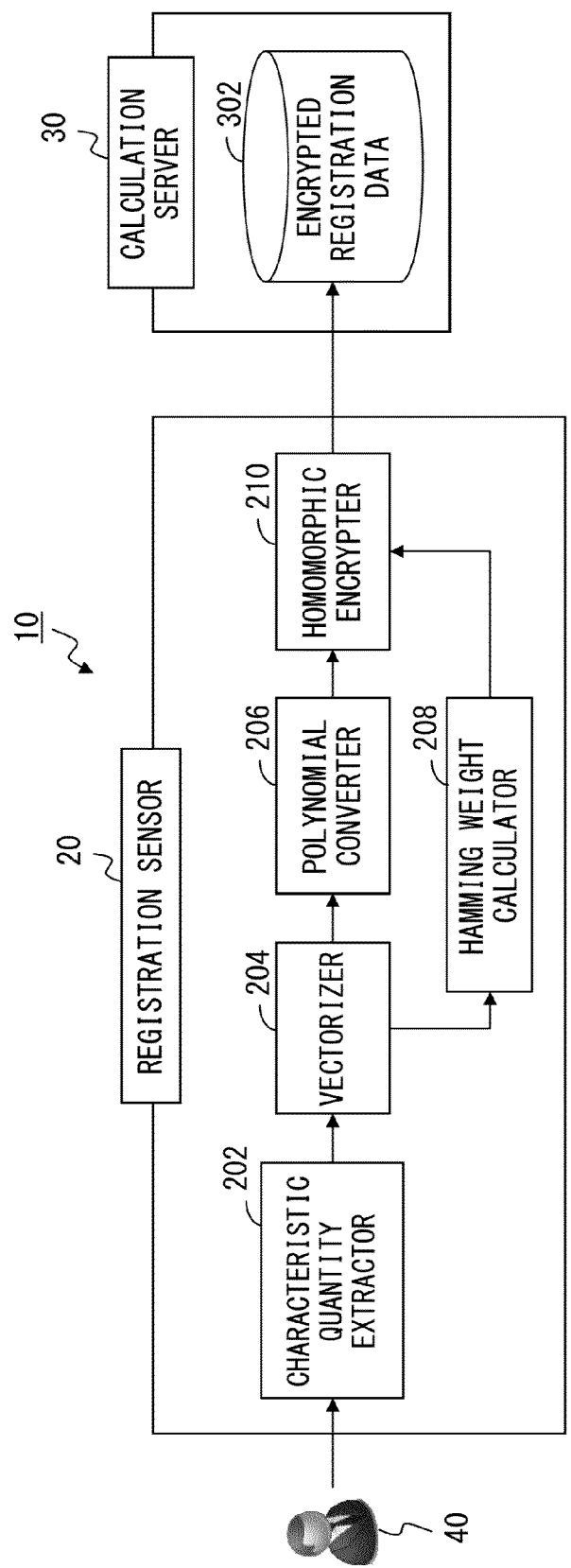
F I G. 2A

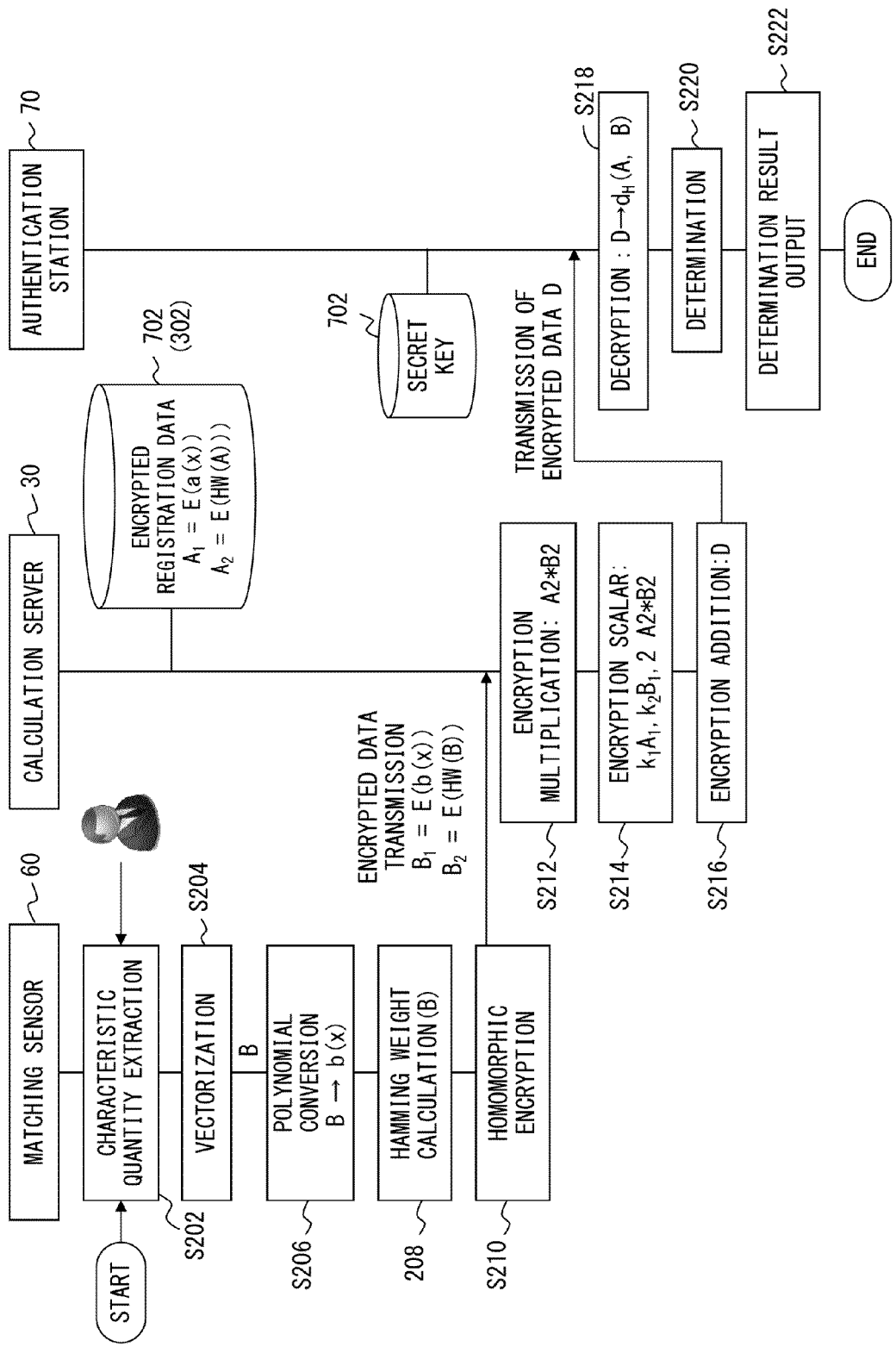
F I G. 4

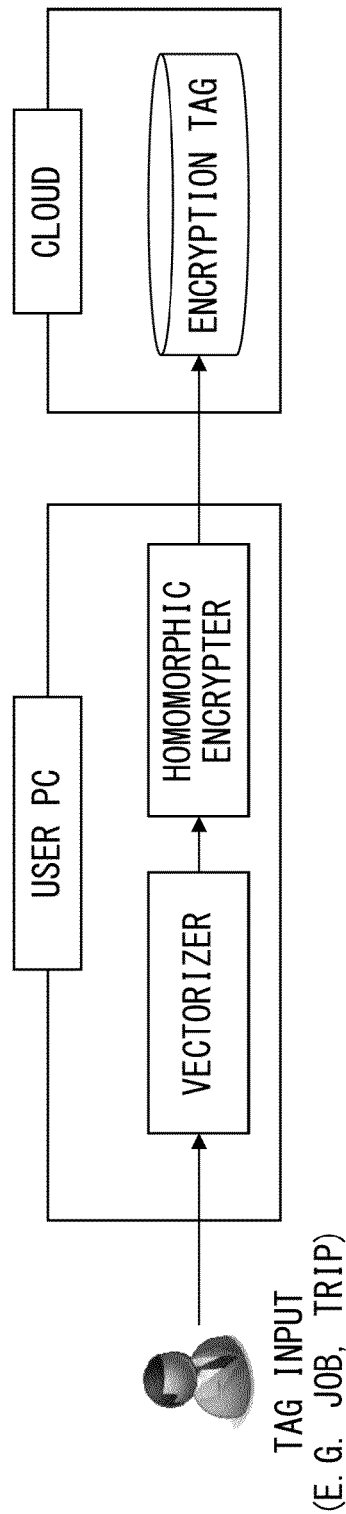
F I G. 5 A

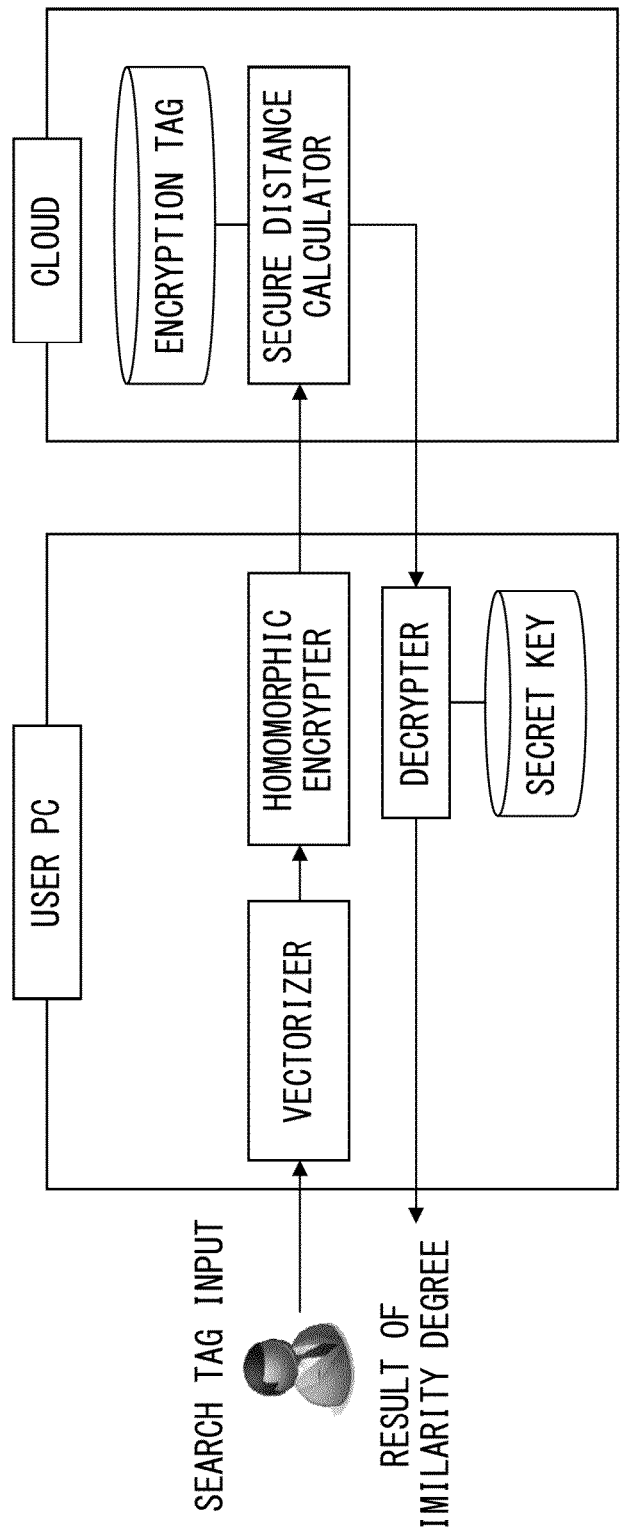
F I G. 5 B

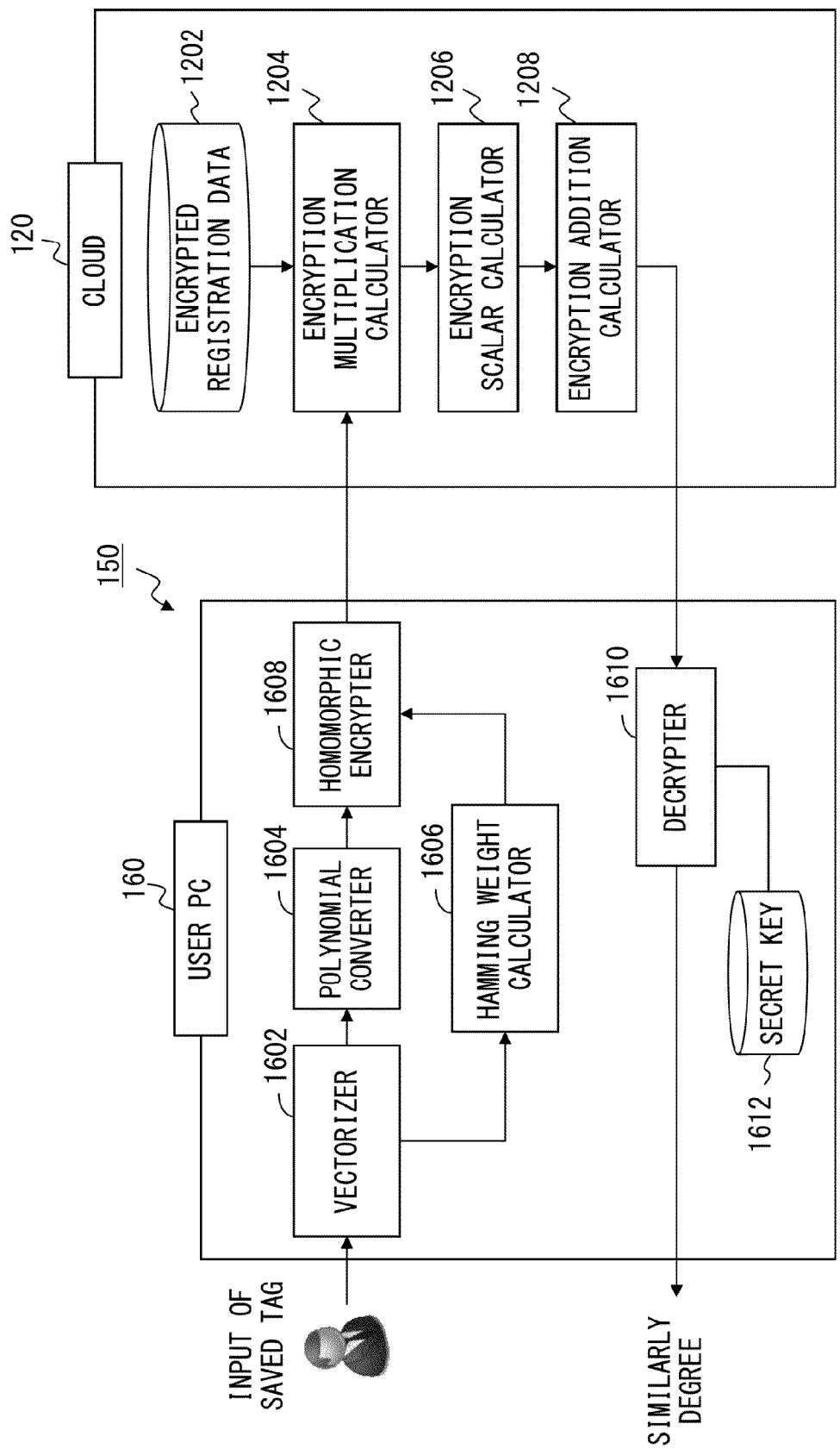
F I G. 6 B

ENCRYPTION PROCESSING APPARATUS AND METHOD

CROSS-REFERENCE TO RELATED APPLICATION

This application is based upon and claims the benefit of priority of the prior Japanese Patent Application No. 2012-286251, filed on Dec. 27, 2012, the entire contents of which are incorporated herein by reference.

FIELD

The embodiments discussed herein are related to an encryption processing apparatus and method.

BACKGROUND

As the importance of protecting personal information and confidential information increases, a market of services using these information has been currently expanding. Examples of such services include a service utilizing position information of an individual user, which can be obtained with a smartphone. Accordingly, attention is paid on confidentiality techniques that can utilize data of protected personal information and confidential information unchanged. Confidentiality techniques include techniques using an encryption technique and a statistical technique according to a data type and a service requirement.

Confidentiality techniques using an encryption technique include a homomorphic encryption technique. The homomorphic encryption technique is one of public key cryptosystems using a pair of different keys for encryption and decryption, and has a function of enabling an operation of encrypted data unchanged.

By using the homomorphic encryption scheme, encrypted text resultant from an addition or multiplication operation can be obtained by performing an arithmetic operation such as an addition or a multiplication without decoding the encrypted text. Expectations have been rising for the use of this property of the homomorphic encryption in electronic voting and electronic cash fields and a recent cloud coMPUting field. RSA encryption scheme that enables only a multiplication, and Additive ElGamal encryption that enables only an addition are known as homomorphic encryption scheme for an addition and a multiplication. Assuming that encrypted texts of plaintexts (messages) a and b are E(a) and E(b), an encrypted text E(a·b) of a product a·b of the plaintexts can be calculated from E(a) and E(b) with multiplicative homomorphic encryption. Moreover, assuming that encrypted texts of plaintexts (messages) a and b are E(a) and E(b), an encrypted text E(a+b) of a sum a+b of the plaintexts can be calculated from E(a) and E(b) with additive hohomorphic encryption. By using the homomorphic encryption scheme, an encrypted text resultant from an arithmetic operation such as an addition or a multiplication can be obtained with an addition or a multiplication of encrypted texts without decrypting the encrypted texts. Expectations have been growing for the use of this property of homomorphic encryption in electronic voting and electronic cash fields, and a recent cloud coMPUting field.

Fully homomorphic encryption has been recently known as encryption having homomorphism for both an addition and a multiplication. If an addition and a multiplication can be performed for encrypted texts unchanged, an arithmetic operation such as an exclusive OR, a logical AND, or a negation can be performed for the encrypted texts unchanged. Namely, fully homomorphic encryption is encryption having homomorphism for arithmetic operations performed by all logic circuits. At first, only logical implementation methods were announced and practical configuration methods were not disclosed. However, not only specific configuration examples of key generation methods but encryption schemes that expand types of data that can be encrypted have been proposed. Moreover, somewhat homomorphic encryption that can perform both an addition and a multiplication by a limited number of times is present. Since this encryption scheme needs far less encryption size and processing performance than those of fully homomorphic encryption, more practical operations are expected.

Generally, an encryption technique is used in a system for verifying similarity between two information. Examples of such a system include a biometric authentication system and a tag search system.

[Patent Document 1] Japanese Laid-open Patent Publication No. 2011-145512
[Non-patent Document 1] C. Gentry, "Fully Homomorphic encryption using ideal lattices", STOC2009, pp. 169-178, 2009
[Non-patent Document 2] C. Gentry and S. Halevi, "Implementing Gentry's Fully Homomorphic Encryption Scheme", EUROCRYPT 2011, LNCS 6632, pp. 129-148, 2011
[Non-Patent Document 3] Yasuda, Yajima, Shimoyama, and Kogure, "Cloud secure summation of purchase history data possessed by a plurality of enterprises", SCIS 2012

SUMMARY

In one aspect of the embodiments, an encryption processing apparatus is disclosed. The encryption processing apparatus includes a processor configured to obtain a first polynomial from a first vector by using a first conversion polynomial, and also obtain a second polynomial from a second vector by using a second conversion polynomial, obtain a first weight for a secure distance of the first vector, and also obtain a second weight for a secure distance of the second vector, obtain a first encrypted polynomial, a second encrypted polynomial, a first encrypted weight, and a second encrypted weight by respectively encrypting the first polynomial, the second polynomial, the first weight, and the second weight by using the homomorphic encryption scheme, and obtain an encrypted secure distance corresponding to encryption of a secure distance between the first vector and the second vector from the first encrypted polynomial, the second encrypted polynomial, the first encrypted weight, and the second encrypted weight.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 2A is a block diagram illustrating an example of a configuration of a biometric authentication system using homomorphic encryption at the time of registration;

FIG. 4 illustrates an example of a process flow of the biometric authentication system using homomorphic encryption at the time of matching;

FIG. 5A is a rough schematic illustrating a tag search system using homomorphic encryption at the time of saving;

FIG. 5B is a rough schematic illustrating the tag search system using homomorphic encryption at the time of a search;

FIG. 6B is a block diagram illustrating an example of a configuration of the tag search system using homomorphic encryption at the time of a search;

DESCRIPTION OF EMBODIMENTS

Figure 1A:
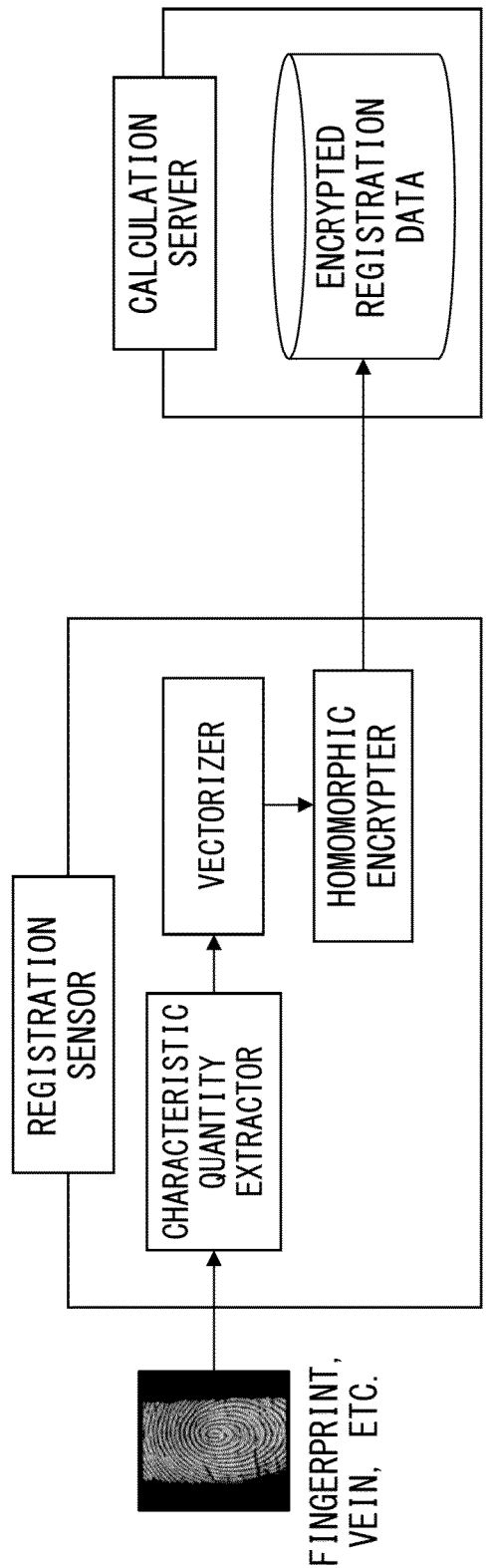
FIG. 1A is a rough schematic illustrating a biometric authentication system using homomorphic encryption at the time of registration.

An apparatus and method for calculating a secure distance such as a Hamming distance or the like by using fully homomorphic encryption will be initially described below. The secure distance calculation is described below by taking, as an example of fully homomorphic encryption, ideal-lattice-based fully homomorphic encryption.

The encryption processing apparatus and methods according to an embodiment may reduce both the size of encrypted vector data and the amount of time requested to calculate a secure distance in a secure distance calculation using homomorphic encryption.

For confidential biometric authentication system and confidential tag search system, which use homomorphic encryption, it is requested to vectorize a characteristic quantity that represents living body information or a tag, and to homomorphically encrypt the vector data. Normally, when vector data $A=(a_1, a_2, \ldots)$ is encrypted with homomorphic encryption, each component $a_1$ is encrypted, and encrypted vector data $E(A)=(E(a_1), E(a_2), \ldots)$ is generated. Moreover, a secure distance between two encrypted vector data $E(A)=(E(a_1), E(a_2), \ldots)$ and $E(B)=(E(b_1), E(b_2), \ldots)$ is calculated. Normally, an encrypted distance is composed of a combination of an encryption addition and an encryption multiplication. Examples of such a secure distance include a Hamming distance represented by $$\sum_i (E(a_i) - E(b_i))^2$$

However, there is a problem such that the sizes of encrypted vector data $E(A)=(E(a_1), E(a_2), \ldots)$, $E(B)=(E(b_1), E(b_2), \ldots)$, and the like become very large when components of vector data are homomorphically encrypted in this way, and a huge amount of time is requested to calculate a secure distance.

<Secure Distance Calculation Using Fully Homomorphic Encryption>

A somewhat homomorphic encryption scheme is initially described. The somewhat homomorphic encryption described below is also called ideal-lattice-based homomorphic encryption. This name is derived from introducing additive homomorphism and multiplicative homomorphism by using ideal lattices.

Somewhat homomorphic encryption is encryption that satisfies homomorphism for arithmetic operations performed by all logic circuits.

Examples of homomorphism include additive homomorphism and multiplicative homomorphism. Additive homomorphism and multiplicative homomorphism mean that a morphism (function) F satisfies, for example, equations (1) and (2) for arguments $m_1$ and $m_2$. Namely, the following equations are satisfied.

$$F(m_1)+F(m_2)=F(m_1+m_2) \quad (1)$$

$$F(m_1) \times F(m_2)=F(m_1 \times m_2) \quad (2)$$

When equation (1) is satisfied, it is called additive homomorphism. When equation (2) is satisfied, it is called multiplicative homomorphism. Plaintexts and an encryption function Enc are respectively substituted for the above described arguments $m_1$, $m_2$, and the morphism F, so that these expressions result in homomorphic encryption. Arithmetic operations for obtaining encrypted texts $\text{Enc}(m_1)$ and $\text{Enc}(m_2)$ from the plaintexts $m_1$ and $m_2$ are referred to also as "encryption".

With the somewhat homomorphic encryption scheme, the presence and the execution of the morphism F that satisfies $$\text{Dec}(F(\text{Enc}(m_1), \text{Enc}(m_2), \ldots, \text{Enc}(m_n)))= F(m_1, m_2, \ldots, m_n) \quad (3)$$

are guaranteed when a key pair (pk,sk), an encryption function, which is a function for encrypting plaintexts with the public key pk of the plaintexts $m_1, m_2, \ldots, m_n$, and a decryption function for decrypting the encrypted text with the secret key sk are respectively assumed to be Enc and Dec. The somewhat homomorphic encryption scheme is a public key cryptosystem. Here, F is assumed to be a morphism. However, F may be an algorithm. Moreover, it is assumed that the morphism F can be represented with a combination of an addition and a multiplication.

The above provided equation (3) means the following. A process on the left side is referred to as a process A, whereas a process on the right side is referred to as a process B. For simplification, the plaintext $m_1$ is considered. In step of encrypting the process A, the plaintext $m_1$ is encrypted with the public key pk, so that encrypted data $c=\text{Enc}(m_1)$ is obtained. Then, a process for exerting a specified morphism (algorithm) F is executed for the encrypted data c by using the public key pk, so that a process result r is obtained. Then, in a decryption step, a decryption process of the process result r is executed by using the secret key sk, so that a decryption result $R=\text{Dec}(F(\text{Enc}(m_1)))$ is generated.

In contrast, in the process B, a process for exerting the specified morphism (algorithm) F is executed for the plaintext $m_1$, so that a process result $R'=F(m_1)$ is obtained.

The above provided equation means that the result $r=\text{Dec}(F(\text{Enc}(m_1)))$ of the process A and the result $R'=F(m_1)$ of the process B are the same.

Additionally, homomorphism for the plaintexts $m_1, m_2, \ldots, m_n$ means $$F(\text{Enc}(m_1), \text{Enc}(m_2), \ldots, \text{Enc}(m_n)) = \text{Enc}(F(m_1, m_2, \ldots, m_n)) \quad (4)$$

Here, note that the arguments of the encryption function Enc is only $F(m_1, m_2, \ldots, m_n)$ on the right side. When the equation (4) is satisfied for an arbitrary F, it is called that full homomorphism is possessed. However, since the above described ideal homomorphic encryption possesses homomophism only for the morphism F obtained by combining additions and multiplications by a finite number of times, this encryption scheme is called somewhat hohormophic encryption.

A key generation method is, for example, as follows.

At the time of key generation, two parameters such as dimensions n and a bit length t are requested. An n-dimensional random number vector $v=(v_0, v_1, \ldots, v_{n-1})$ where absolute values of components are an integer of t bits or less is generated for the dimensions n and the bit length t. At this time, the secret key is defined as a matrix represented by $$V = \begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix} \quad (5)$$

Additionally, a matrix B, which is an Hermite normal form of the above provided matrix V, is defined as a public key. The Hermite normal form is a lower or upper triangular matrix obtained by performing an elementary row operation for integers of an integral matrix. Generally, it is well known that the Hermite normal form can be efficiently calculated. By using the matrix B, which is the Hermite normal form of the matrix V, as a public key, the amount of calculation time can be reduced.

Encryption is described. When a 1-bit plaintext b is encrypted by using the public key B, an n-dimensional random number vector $u=(u_0, u_1, \ldots, u_{n-1})$ where components are 0 or 1 is initially selected, and a vector a $$a = 2u + b \times e_1 = (2u_0 + b, 2u_1, \ldots, 2u_{n-1}) \quad (6)$$

is generated by assuming $e_1 = (1, 0, \ldots, 0)$. Thus obtained vector a is sometimes referred to as a fresh encrypted text.

An encrypted text c of the 1-bit plaintext b is generated as follows $$c = a \mod B = a - \lfloor a \times B^{-1} \rceil \times B, \quad (7)$$

where $B^{-1}$ is an inverse matrix of the matrix B, bracket is a function for giving an integer value nearest to a rational number q.

When the encrypted text c of the 1-bit plaintext b is decrypted, an n-dimensional vector a' defined by the equation (8)

$$a' = c \mod V = c - \lfloor c \times V^{-1} \rceil \times V \quad (8)$$

is initially calculated. Next, a first component $a_0'$ of the n-dimensional vector a' is taken, and a remainder obtained by dividing the integer $a_0'$ by 2 results in a value into which the encrypted text c is decrypted.

Additionally, the following method is known as another decryption method. Assume that the first component of the encrypted text a is c. Also assume that w is an element of the inverse matrix $V^{-1}$ of the secret key V and is an odd number. Furthermore, $$[x]_d = x \mod d \quad (9)$$

having a value range of $[-d/2, d/2]$ is assumed. In the equation (9), d is a discriminant of the public key B. At this time, the encrypted text c is defined by $$c = [c \times w]_d \mod 2 \quad (10)$$

A numerical example of the above described key generation, encryption and decryption is described. A case where dimensions n are 4 and a bit length t is 7 is described. Initially, a four-dimensional random number vector having an absolute value of an integer of 7 bits or less $v=(112, 99, -125, 77)$ is selected. At this time, the matrix V $$V = \begin{bmatrix} 112 & 99 & -125 & 81 \\ -81 & 112 & 99 & -125 \\ 125 & -81 & 112 & 99 \\ -99 & 125 & -81 & 112 \end{bmatrix} \quad (11)$$

is defined as a secret key. Next, the Hermite normal form B of the secret key V is calculated as $$B = \begin{bmatrix} 1143821449 & 0 & 0 & 0 \\ 982623548 & 1 & 0 & 0 \\ 480851699 & 0 & 1 & 0 \\ 190648369 & 0 & 0 & 1 \end{bmatrix} \quad (12)$$

and this matrix B is defined as a public key.

A case where the plaintext b=1 is encrypted by using the public key B is considered. Initially, a four-dimensional random number vector $u=(1,0,1,1)$ where components are 0 or 1 is selected. Next, a fresh encrypted text a is calculated. In this case, the fresh encrypted text a is $$a = 2u + b \times e_1 = (3,0,2,2) \quad (13)$$

Then, the encrypted text c of the plaintext b=1 results in $$c = a \mod B = a - \lfloor a \times B^{-1} \rceil \times B = (-199178684, 0, 0, 0) \quad (14)$$

where $a \times B^{-1} = (-1343000133/1143821449, 0, 2, 2)$, and $a \times B^{-1} = (-1, 0, 2, 2)$. Finally, the encrypted text c is proved to be $-199178684$.

When the encrypted text c is decrypted by using the secret key V, the four-dimensional vector a' defined by the equation (8) is initially calculated. In this case, the four-dimensional vector a' is $a' = (3, 0, 2, 2)$. A remainder obtained by dividing the first component of the four-dimensional vector a' by 2 is $3 = 2 + 1$. Therefore, the encrypted text c results in 1, proving that the encrypted text is successfully decrypted. With the above described homomorphic encryption scheme, the four-dimensional vector a and the four-dimensional vector a' match.

The case where the plaintext b is of 1 bit has been described above. However, a definition range of a plaintext is expandable. The plaintext b is selected from $\{0, 1, \ldots, s-1\}$. Namely, also when a plaintext spatial size is s, the plaintext can be encrypted and decrypted with a method similar to the above described one.

When the plaintext b of the plaintext spatial size s or less is encrypted by using the public key B, the n-dimensional random number vector $u=(u_0, u_1, \ldots, u_{n-1})$ where components are 0 or 1 is initially selected, and the vector a $$a = su + b \times e_1 = (su_0 + b, su_1, \ldots, su_{n-1}) \quad (15)$$

is generated. Similarly to the above described case, $e_1=(1, 0, \ldots, 0)$. Also this vector a is sometimes referred to as a fresh encrypted text. Similarly to the above described expression (7), the encrypted text c of the plaintext b is given by $$c = a \bmod B = a - \lfloor a \times B^{-1} \rceil \times B. \tag{16}$$

Here, since the vector $c=(c, 0, \ldots, 0)$, the encrypted text c is an integer.

To decrypt the encrypted text c of the plaintext b, the n-dimensional vector a' defined by $$a' = c \bmod V = c - \lfloor c \times V^{-1} \rceil \times V, \tag{17}$$

is initially calculated. Next, a first component $a_0'$ of the n-dimensional vector a' is taken, and a remainder obtained by dividing the integer $a_0'$ by the plaintext spatial size s results in a value into which the encrypted text c is decrypted. In this decryption process, a process for multiplying the vector c by the matrix $V^{-1}$, and a process for multiplying the vector obtained by this multiplication by the matrix V are executed. Namely, the calculation of the product of the vector and the matrix is performed twice. The number of multiplications performed at this time is $2 \times D^2$ in proportion to the number D of components of the vector. If the size of handled data is large, one multiplication is a multiplication of a multiple length.

A numerical example of the key generation, encryption and decryption is described. A case where the dimensions n is 4, the bit length t is 7, and the plaintext spatial size s is 13 is described. Initially, a four-dimensional random number vector $v=(112, 99, -125, 81)$ having an absolute value of an integer of 7 bits or less is selected. At this time, the secret key V results in a matrix $$V = \begin{bmatrix} 112 & 99 & -125 & 81 \\ -81 & 112 & 99 & -125 \\ 125 & -81 & 112 & 99 \\ -99 & 125 & -81 & 112 \end{bmatrix}. \tag{18}$$

Next, the Hermite normal form of the secret key V is calculated as $$B = \begin{bmatrix} 1143821449 & 0 & 0 & 0 \\ 982623548 & 1 & 0 & 0 \\ 480851699 & 0 & 1 & 0 \\ 190648369 & 0 & 0 & 1 \end{bmatrix}. \tag{19}$$

This matrix B defines a public key.

A case where the plaintext $b=3$ having the plaintext spatial size $s=13$ or less is encrypted by using the public key B is considered next. The four-dimensional random number vector $u=(1,0,1,1)$ where components are 0 or 1 is initially selected. The vector a results in $a=(16,0,13,13)$. Next, the encrypted text c of the plaintext $b=3$ results in $$c = a \bmod B = a - \lfloor a \times B^{-1} \rceil \times B = (421070724, 0, 0, 0), \tag{20}$$

where $a \times B^{-1} = (-8729500868/1143821449, 0, 13, 13)$, and $a \times B^{-1} = (-8, 0, 13, 13)$ To decrypt the encrypted text c by using the secret key V, the four-dimensional vector $a'=(16,0,13,13)$ is initially calculated. A remainder 3 obtained by dividing the first component of the four-dimensional vector a' by the plaintext spatial size $s=13$ results in a decrypted value.

An addition and a multiplication of encrypted data are described. As in the above described numerical example, encrypted text can be represented as an n-dimensional vector $c=(c_1, 0, \ldots)$ where components other than the first component are always 0. The integer of the first component of this encrypted text can be also calculated as $$c_1 = \left[ b + s \sum_{i=0}^{n-1} u_i \times r^i \right]_d \tag{21}$$

by using the n-dimensional vector $u=(u_0, u_1, \ldots u_{n-1})$ used for the encryption, the plaintext b and the plaintext spatial size s. However, $[x]_d$ is $$[x]_d = x \bmod d \tag{22}$$

and is an integer having a value range of $[-d/2, d/2]$. d is (1,1) component of the matrix B that represents the public key, and r is (2,1) component of the matrix B that represents the public key. In the above described example, $d=1143821449$ and $r=982623548$. As a result, the encrypted text can be regarded as integral data.

For the two encrypted texts $c_1$ and $c_2$, an encryption addition and an encryption multiplication are defined as $[c_1+c_2]_d$ and $[c_1 \times c_2]_d$, respectively.

The above described properties of homomorphic encryption may be applied, for example, to a comparison made between two vector data as follows.

Assume that vector data $A=(a_1, a_2, \ldots a_n)$ and vector data $B=(b_1, b_2, \ldots, b_n)$ are present. Here, assume that the vector data A and B can be represented as n-dimensional vector quantities.

A conversion polynomial $$a(x) = \sum_{i=1}^{n} a_i x^{i-1} \tag{23}$$

is calculated for the vector data $A=(a_1, a_2, \ldots a_n)$. Then, encrypted data $Enc(a(x))$ is calculated by encrypting the conversion polynomial a(x). In this case, $Enc(a(x))$ is defined as $$Enc(a(x)) = \left[ a(r) + s \times \sum_{i=0}^{n-1} u_i \times r^{i-1} \right]_d. \tag{24}$$

A conversion polynomial $$b(x) = \sum_{j=1}^{n} b_j x^{n-j+1} \tag{25}$$

is calculated for the vector data $B=(b_1, b_2, \ldots, b_n)$. Then, encrypted data $Enc(b(x))$ is calculated by encrypting the conversion polynomial b(x). The conversion polynomial for the vector data $B=(b_1, b_2, \ldots, b_n)$ is different from that for the vector data $A=(a_1, a_2, \ldots, a_n)$.

<Secure Distance Calculation Using Homomorphic Encryption>

To calculate a secure distance, two integers $C_2$ and $C_2$ are prepared in advance. The two integers $C_2$ and $C_2$ are defined by the following expressions (26a) and (26b).

$$C_1 = \left[ -\sum_{i=1}^{n} r^{n-i+1} \right]_d \quad (26a)$$

$$C_2 = \left[ -\sum_{j=1}^{n} r^{j-1} \right]_d \quad (26b)$$

At this time, the secure distance d is represented as $$d = C_1 \times \text{Enc}(a(x)) + C_2 \times \text{Enc}(b(x)) + 2\text{Enc}(a(x)) \times \text{Enc}(b(x)), \quad (27)$$

where $C_1 \times \text{Enc}(a(x))$ and $C_2 \times \text{Enc}(b(x))$ respectively correspond to Hamming weights HW(a) and HW(b) in the encrypted text. By decrypting the above secure distance d, a Hamming distance between the two vector data $A = (a_1, a_2, \ldots, a_n)$ and $B = (b_1, b_2, \ldots, b_n)$ is obtained. The Hamming distance has been used as the secure distance in the above provided explanation. However, the disclosed method is also applicable to a distance calculation such as a Euclidean distance, and a similarity degree calculation such as a cosine similarity degree.

Here, a numerical example is provided. A case where the Hamming distance is calculated between the encrypted vector data A=(1, 0, 1, 1) and vector data B (0,0,1,0) unchanged is considered. It is evident that the Hamming distance between the vector data A=(1,0,1,1) and the vector data B=(0,0,1,0) is 2.

A conversion polynomial $a(x) = 1 + x^2 + x^3$ and a Hamming weight HW(A)=1+1+1=3 are calculated for the vector data A=(1,0,1,1). Next, assume that the public key matrix B is the above described one, and d and r are respectively 1143821449 and 982623548. Here, note that encryption can be performed if only two data d and r are present. Also assume that a plaintext spatial size s is 4. Encrypted data of the conversion polynomial a(x) results in Enc(a(x))=−570758831 by using the above described equation (19). Further assume the four-dimensional random number vector u=(0,1,1,0). Encrypted data Enc(HW(A)) obtained by encrypting the Hamming weight HW(A)=3 is $$\text{Enc}(HW(A)) = \left[ HW(A) + s \sum_{i=1}^{n} u_i \times r^i \right]_d \quad (28)$$
$$= -381227966,$$

when the four-dimensional random number vector u=(1,0,0,1) is assumed.

Similarly, the conversion polynomial $b(x) = x^2$ and the Hamming weight HW(B)=1 are calculated for the vector data B=(0,0,1,0). Encrypted data Enc(HW(B)) obtained by encrypting the Hamming weight HW(B)=1 results in $$\text{Enc}(HW(B)) = \left[ HW(B) + s \sum_{i=1}^{n} u_i \times r^i \right]_d \quad (29)$$
$$= -190648370,$$

when the four-dimensional random number vector u=(0,0,0,1) is assumed.

The secure distance d results in d=Enc(HW(A))+Enc(HW(B))+2×Enc(a(x))×Enc(b(x))=58147359 by using Enc(HW(A)), Enc(HW(B)), Enc(a(x)), and Enc(b(x)).

Lastly, the encrypted data d is decrypted by using the secret key matrix V, so that $c - [c \times V^{-2}] \times V = (10, 30, -42, 11)$ is obtained when d=(58147359,0,0,0) is assumed. When a remainder is obtained by dividing the first component of this vector data by the plaintext spatial size s=4, a decryption result is 2, which matches the Hamming distance between the two vector data A and B.

Additionally, the equations (26a), (26b) and (27) are used in the above provided explanation. However, the secure distance d may be defined as $$d = C_1 \times \text{Enc}(a(x)) + C_2' \times \text{Enc}(b'(x)) - 2\text{Enc}(a(x)) \times \text{Enc}(b'(x)) \quad (30)$$

by respectively replacing b(x) and $C_2$ with b'(x) and $C_2'$ represented by the following equations.

$$b'(x) = -\sum_{j=1}^{n} b_j x^{n-j+1}, \quad (31a)$$

$$C_2' = -\left[ \sum_{j=1}^{n} r^{j-1} \right]_d. \quad (31b)$$

Note that the sign of the third term on the right side of the equation (30) is different from that of the equations (27). The equation (30) may be calculated as $$d = C_2(-\text{Enc}(a(x)) + \text{Enc}(b'(x))) + 2\text{Enc}(a(x)) \times (1 - \text{Enc}(b'(x))). \quad (32)$$

The disclosed method has the following characteristics as described above.
(1) Using the lattice-based homomorphic encryption.
(2) Converting a vector that represents a characteristic quantity into a polynomial with a conversion polynomial.
(3) Using an encrypted text of a conversion polynomial, and an encrypted text of a weight such as a Hamming weight or the like.
(4) Using homomorphism for a polynomial arithmetic operation of homomorphic encryption as a secure distance calculation. By using homomorphic encryption for a calculation of a secure distance such as a Hamming distance or the like, the size of encrypted data and the amount of calculation time can be significantly reduced.

The above described ideal-lattice-based homomorphic encryption and decryption can be also explained as follows.

Initially, terms are briefly defined.

A lattice is a discrete additive partial group within $Z^n$ when Z is assumed as a ring of integers. Assuming that $b_0, \ldots, b_{n-1}$ are linearly independent within $Z^n$, a square matrix $B = [b_0, \ldots, b_{n-1}]$ generated by arranging these components is called a base. The lattice L can be represented as $$L = \sum_{i=0}^{n-1} v_i \cdot b_i, \quad (33)$$

when v is assumed to be an element of $Z^n$.

If the lattice L is an ideal lattice, this means that an ideal I of a ring R=Z[x]/f(x) isomorphic to the lattice L is present. Here, Z[x] is a polynomial ring with integer coefficients, and f(x) is an n-dimensional monic polynomial with integer coefficients.

A member of a principal ideal generated by one member $$a = a_0 + a_1 \cdot x + a_2 \cdot x^2 + \ldots + a_{n-1} x^{n-1} \bmod f(x) \quad (34)$$

of a residue ring R can be represented as a linear combination of $a$, $a \cdot (x)$, $a \cdot (x)^2$, $a \cdot (x)^{n-1}$. A transposition of a is represented as $a^T$.

A monic polynomial with integer coefficients $a(x) = a_0 + a_1 x + \ldots + a_{n-1} x^{n-1}$ of the ring $R = Z[x]/(x^n + 1)$ is considered by assuming $f(x) = x^n + 1$. To identify the vector $a = (a_0, a_1, \ldots, a_{n-1})$ as the ring $R = Z[x]/(x^n + 1)$, the following operations are performed. Namely, a rotation matrix is defined for a.

$$Rot(a) = \begin{bmatrix} a_0 & a_1 & a_2 & \ldots & a_{n-1} \\ -a_{n-1} & a_0 & a_1 & \ldots & a_{n-2} \\ -a_{n-2} & -a_{n-1} & a_0 & \ldots & a_{n-3} \\ \vdots & \vdots & \vdots & \ddots & \vdots \\ -a_1 & -a_2 & -a_3 & \ldots & a_0 \end{bmatrix} \quad (35)$$

This is the same as the above provided equation (5). Thus, the product can be defined with $a(x) \cdot b(x) = Rot(a) \cdot b$ for the two polynomials $a(x)$ and $b(x)$. Moreover, the circulant matrix $Rot(a)$ results in a basic matrix.

Then, key generation in the above described lattice-based homomorphic encryption method is implemented as follows. Namely, a basic matrix of an ideal J, which is relatively prime to an ideal I of the ring $R = Z[x]/(x^n + 1)$, is the secret key V, and the public key B is the Hermite normal form of the basic matrix of the public key. For example, the secret key can be defined as a matrix represented by $n^{1/2} I + R$ when R is a random matrix having a small norm.

At this time, for the encrypted text c of the plaintext b, r is selected from R, and defined as the first component of $c = b + rs$ mod B in the encryption. If the norm of the plaintext b is small, the encrypted text can be decrypted with $b = (c \mod B) \mod I$.

By calculating a secure distance such as a Hamming distance or the like with the use of the above described lattice-based somewhat homomorphic encryption, both the size of encrypted vector data and the amount of time of a secure distance calculation can be reduced.

The above described homomorphic encryption scheme is applicable, for example, to a biometric authentication system, a tag search system, and the like.

Additionally, the above described homomorphic encryption scheme can be implemented, for example by an apparatus illustrated in FIG. 9 as will be described later.

Such an encryption processing apparatus includes a polynomial converter, a weight calculator, a homomorphic encrypter, and a secure distance calculator as will be described in the following embodiment. The polynomial converter obtains a first polynomial from a first vector by using a first conversion polynomial, and also obtains a second polynomial from a second vector by using a second conversion polynomial. The weight calculator obtains a first weight for the secure distance of the first vector, and also obtains a second weight for the secure distance of the second vector. The homomorphic encrypter obtains the first encrypted polynomial, the second encrypted polynomial, the first encrypted weight, and the second encrypted weight by respectively encrypting the first polynomial, the second polynomial, the first weight, and the second weight with the use of the homomorphic encryption scheme. The secure distance calculator obtains an encrypted secure distance corresponding to encryption of a secure distance between the first vector and the second vector from the first encrypted polynomial, the second encrypted polynomial, the first encrypted weight and the second encrypted weight.

First Embodiment

A biometric authentication system as an example of an encryption processing apparatus using the above described ideal-lattice-based fully homomorphic encryption is described with reference to FIGS. 1-4.

The biometric authentication system authenticates a user as an authorized user by using living body information such as voice, a fingerprint, a vein pattern, a face, an iris, or the like, which are information unique to an individual. Since the living body information is important personal information, it is preferable to use encrypted information also at the time of authentication. To determine whether or not a user is an authorized user, living body information of a user to be authenticated is compared with preregistered living body information. At the time of this comparison, encrypted information can be compared by using homomorphic encryption.

Figure 1B:
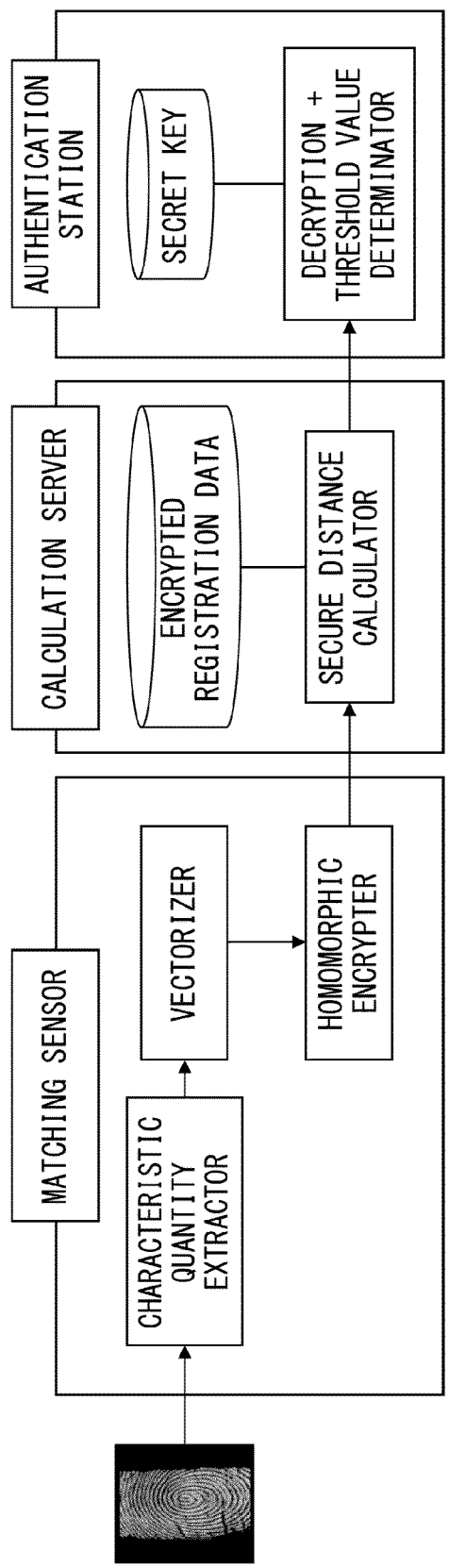
FIG. 1B is a rough schematic illustrating a biometric authentication system using homomorphic encryption at the time of matching.

FIGS. 1A and 1B are rough schematics illustrating the biometric authentication system using homomorphic encryption. FIG. 1A is the rough schematic illustrating the biometric authentication system when reference information used for biometric authentication is registered. FIG. 1B is the rough schematic illustrating the biometric authentication system when a comparison is made to determine whether or not a user is an authorized user.

The biometric authentication system illustrated in FIGS. 1A and 1B is an individual authentication system using living body information such as a fingerprint, a vein, or the like. The individual authentication system using living body information is an individual authentication system easy to use since there is no need to remember complicated information such as a password or the like. On the other side, since the living body information is confidential information permanently unique to each user, this information needs to be securely protected from being leaked out. The biometric authentication system illustrated in FIGS. 1A and 1B is a system that can authenticate a user while protecting living body information of the user with homomorphic encryption.

As illustrated in FIG. 1A, when reference information used for biometric authentication is registered, a registration sensor extracts a characteristic quantity of part of a living body of an authorized user, and vectorizes the characteristic quantity. Moreover, the vectorized characteristic quantity is homomorphically encrypted. Moreover, the registration sensor transmits the homomorphically encrypted characteristic quantity to a calculation server, and registers the characteristic quantity to a database of the calculation server as encrypted registration data.

As illustrated in FIG. 1B, a matching sensor extracts a characteristic quantity of part of a living body of a user in order to authenticate whether or not the user is an authorized user, and vectorizes the characteristic quantity. Moreover, the vectorized characteristic quantity is homomorphically encrypted. Then, the homomorphically encrypted characteristic quantity is transmitted to the calculation server. The calculation server obtains a result of a secure distance calculation by calculating a secure distance between the homomorphically encrypted characteristic quantity that has been received and the registered encryption data. Then, the calculation server transmits the result of the secure distance calculation to an authentication station having a secret key of homorphic encryption. The authentication station decrypts the transmitted result of the secure distance calculation, and makes a comparison between a decryption result and a threshold value. If the decryption result is smaller than the threshold value, the user is authenticated as the authorized user. In this embodiment, a Hamming distance is used as a secure distance.

In the biometric authentication system illustrated in FIGS. 1A and 1B, the Hamming distance between two data such as a preregistered characteristic quantity and a characteristic quantity of a user to be authenticated can be calculated in a homomorphically encrypted state unchanged. Accordingly, only homomorphically encrypted living body vector data is transmitted to the calculation server, which does not have the secret key and is therefore unable to learn the living body information of the user, so that the information is made confidential. Moreover, since the authentication station decrypts only the result of the secure distance calculation, it is unable to learn the living body information of the user, namely, an unencrypted characteristic quantity. As a result, an individual authentication service can be received while protecting the living body information of the user.

<Configuration of the Biometric Authentication System>

The biometric authentication system illustrated in FIGS. 1A and 1B is described in detail with reference to FIGS. 2A and 2B.

FIG. 2A is a block diagram illustrating the biometric authentication system 10, which is an example of the configuration of the biometric authentication system using homomorphic encryption at the time of registration.

The biometric authentication system 10 includes a registration sensor 20 and a calculation server 30. The registration sensor 20 includes a characteristic quantity extractor 202, a vectorizer 204, a polynomial converter 206, a Hamming weight calculator 208, and a homomorphic encrypter 210. These components are sometimes referred to as the first characteristic quantity extractor 202, the first vectorizer 204, the first polynomial converter 206, the first Hamming weight calculator 208, and the first homomorphic encrypter 210. Moreover, the first Hamming weight calculator 208 is sometimes referred to simply as the weight calculator 208.

The calculation server 30 includes encrypted registration data 302 where living body information of an authorized user 40 is stored as reference information. As illustrated in FIG. 2B, the calculation server 30 includes an encryption multiplication calculator 304 for performing a multiplication operation of two homomorphically encrypted data, an encryption scalar calculator 306 for performing a scalar multiplication of homomorphically encrypted data, and an encryption addition calculator 308 for performing an addition operation of two homomorphically encrypted data although these components are not illustrated in FIG. 2A.

The encryption multiplication calculator 304, the encryption scalar calculator 306, and the encryption addition calculator 308 are combined, so that a secure distance calculator is configured.

The characteristic quantity extractor 202 obtains part of living body information of the user 40 registered as an authorized user from the sensor, and extracts a characteristic quantity. The characteristic quantity may be a fingerprint as illustrated in FIG. 1A. Thus, the first characteristic quantity extractor 202 extracts, as a first characteristic quantity, a characteristic for distinguishing the authorized user from other users based on information about part of the living body of the authorized user.

The vectorizer 204 represents the characteristic quantity extracted by the characteristic quantity extractor 202 as an n-dimensional vector a. For example, the vector a is represented as $$a = (a_0, a_1, \ldots, a_{n-1}), \quad (36)$$

when $a_0, \ldots, a_{n-1}$ are assumed to be 0 or 1. In this way, the first vectorizer 204 represents the first characteristic quantity as the first vector a.

The polynomial converter 206 converts the vector a obtained by the vectorizer 204 into a polynomial. For example, a conversion polynomial $$a(x) = \sum_{i=0}^{n-1} a_i x^{i-1} \quad (37)$$

is calculated. Thus, the (first) polynomial converter 206 obtains a first polynomial a(x) from the first vector a by using the first conversion polynomial.

The Hamming weight calculator 208 calculates the Hamming weight HW(a) of the vector a. In this case, the Hamming weight HW(a) is $$HW(a) = \sum_{i=0}^{n-1} a_i \quad (38)$$

Thus, the (first) Hamming weight calculator 208 calculates the first weight HW(a) for a secure distance of the first vector a. In this case, the secure distance is the Hamming distance, and the first weight is the Hamming weight.

The homomorphic encrypter 210 obtains Enc(a(x)) and Enc(HW(a))

$$Enc(a(x)) = \left[ a(r) + s \times \sum_{i=0}^{n-1} u_i \times r^{i-1} \right]_d \quad (39a)$$

$$Enc(HW(a)) = \left[ HW(a(r)) + s \times \sum_{i=0}^{n-1} u_i' \times r^{i-1} \right]_d \quad (39b)$$

by encrypting the polynomial a(x) obtained by the polynomial converter 206, and the Hamming weight HW(a) obtained by the Hamming weight calculator 208. Thus, the (first) homomorphic encrypter 210 obtains the first encrypted polynomial Enc(a(x)) and the first encrypted weight Enc(HW(a)) by respectively encrypting the first polynomial a(x) and the first weight HW(a) with the use of the homomorphic encryption scheme. Here, $u_i$ of Enc(HW(a)) and $u_i'$ of Enc(a(x)) in the equations (39a) and (39b) may be different random numbers. Similarly, Enc(b(x)) and Enc(HW(b)) may be different random numbers.

The encrypted data Enc(a(x)) and Enc(HW(a)), which are obtained by the homomorphic encrypter 210, are transmitted to the calculation server 30, which then stores the data as the encrypted registration data 302.

Figure 2B:
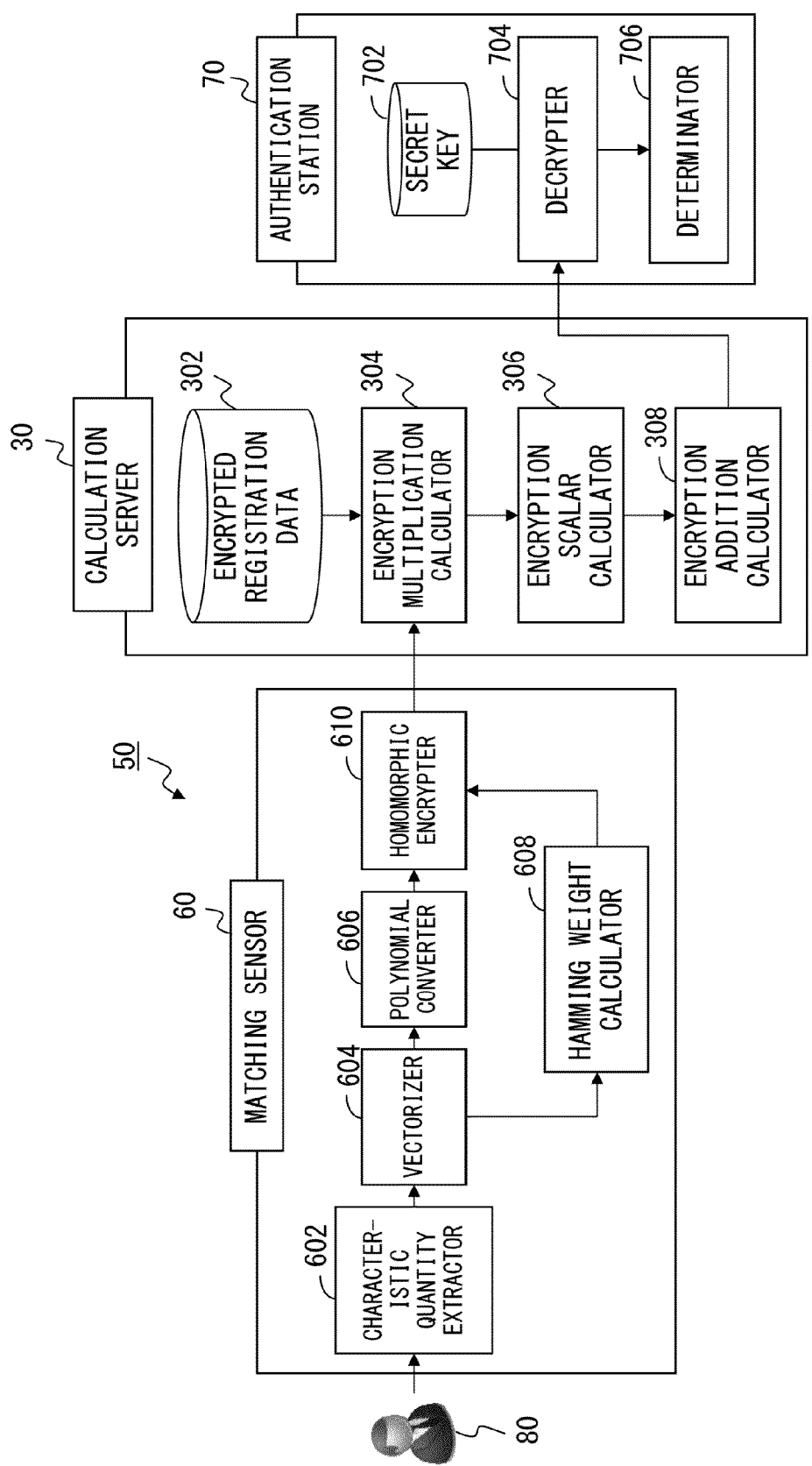
FIG. 2B is a block diagram illustrating an example of a configuration of the biometric authentication system using homomorphic encryption at the time of matching.

FIG. 2B is a block diagram illustrating a biometric authentication system 50, which is an example of a configuration of the biometric authentication system using homomorphic encryption at the time of matching.

The biometric authentication system 50 includes a matching sensor 60, the calculation server 30, and the authentication station 70. The matching sensor 60 includes a characteristic quantity extractor 602, a vectorizer 604, a polynomial converter 606, a Hamming weight calculator 608, and the homomorphic encrypter 610. These components have configurations identical or similar to those of the characteristic quantity extractor 202, the vectorizer 204, the polynomial converter 206, the Hamming weight calculator 208, and the homomorphic encrypter 210 of the registration sensor 20. Moreover, these components are sometimes referred to as the second characteristic quantity extractor 602, the second vectorizer 604, the second polynomial converter 606, the second Hamming weight calculator 608, and the second homomorphic encrypter 610. The first characteristic quantity extractor 202, the first vectorizer 204, the first polynomial converter 206, the first Hamming weight calculator 208, and the first homomorphic encrypter 210 are sometimes used without being distinguished from the second characteristic quantity extractor 602, the second vectorizer 604, the second polynomial converter 606, the second Hamming weight calculator 608, and the second homomorphic encrypter 610. Moreover, the second Hamming weight calculator 608 is sometimes referred to simply as the weight calculator 208.

The characteristic quantity extractor 602 obtains part of information of a living body of a user 80 to be authenticated from the sensor, and extracts a characteristic quantity. The characteristic quantity may be a fingerprint as illustrated in FIG. 1B. Thus, the second characteristic quantity extractor 602 extracts a second characteristic quantity to be compared with the first characteristic quantity of the authorized user from the information about part of the living body of the user to be authenticated as the authorized user.

The vectorizer 604 represents the characteristic quantity extracted by the characteristic quantity extractor 602 as an n-dimensional vector b. The vector b is represented as $$b=(b_0, b_1, \ldots, b_{n-1}) \tag{40}$$

when $b_0, \ldots, b_{n-1}$ are assumed to be 0 or 1. Thus, the second vectorizer 604 represents the second characteristic quantity as the second vector b.

The polynomial converter 606 converts the vector b obtained by the vectorizer 604 into a polynomial. For example, a conversion polynomial $$b(x) = \sum_{j=0}^{n-1} b_j x^{n-j+1} \tag{41}$$

is calculated. Note that the conversion polynomial b(x) at the time of matching is different from the conversion polynomial a(x) at the time of registration. As described above, the (second) polynomial converter 606 obtains the second polynomial b(x) from the second vector b by using the second conversion polynomial.

The Hamming weight calculator 608 calculates the Hamming weight HW(b) of the vector b. In this case, the Hamming weight HW(b) is $$HW(b) = \sum_{i=0}^{n-1} b_i. \tag{42}$$

Thus, the (second) weight calculator 608 calculates the second weight HW(b) for the secure distance of the second vector b. In this case, the secure distance is the Hamming distance, and the second weight is the Hamming weight.

The polynomial obtained by the polynomial converter 606 and the Hamming weight HW(b) obtained by the Hamming weight calculator 608 are encrypted by the homomorphic encrypter 610, so that Enc(b(x)) and Enc(HW(b)) are obtained. As described above, the (second) homomorphic encrypter 610 obtains the second encrypted polynomial Enc(b(x)) and the second encrypted weight Enc(HW(b)) by respectively encrypting the second polynomial b(x) and the second weight HW(b) with the use of the homomorphic encryption scheme.

The encrypted data Enc(b(x)) and Enc(HW(b)), which are obtained by the homomorphic encrypter 610, are transmitted to the calculation server 30. Enc(b(x)) and Enc(HW(b)) are respectively obtained by replacing a(x) with b(x) in the above provided equations (38), (39a), and (39b).

The encryption multiplication calculator 304 of the calculation server 30 calculates a product $$C_1 = \text{Enc}(a(x)) \times \text{Enc}(b(x)) \tag{43}$$

of Enc(a(x)) stored as the encrypted registration data 302 and Enc(b(x)) obtained by the homomorphic encrypter 610.

The encryption scalar calculator 306 calculates products $$k_1 \times \text{Enc}(a(x)) \tag{45a}$$

$$k_2 \times \text{Enc}(b(x)) \tag{45b}$$

of two integers $$k_1 = \left[ -\sum_i r^{n-i} \right]_d \tag{46a}$$

$$k_2 = \left[ -\sum_j r^j \right]_d \tag{46b}$$

calculated in advance, and Enc(a(x)) and Enc(b(x)). Moreover, the encryption scalar calculator 306 calculates a double of $C_1$ obtained by encryption multiplication calculator 304:

$$2 \times C_1 = 2 \times \text{Enc}(a(x)) \times \text{Enc}(b(x)) \tag{47}$$

The encryption addition calculator 308 calculates a sum of $k_1 \times \text{Enc}(HW(a))$, $k_2 \times \text{Enc}(HW(b))$, and $2 \times \text{Enc}(a(x)) \times \text{Enc}(b(x))$, and calculates the Hamming distance D represented by the equation (44) as a secure distance:

$$D = k_1 \times \text{Enc}(a(x)) + k_2 \times \text{Enc}(b(x)) + 2 \times \text{Enc}(a(x)) \times \text{Enc}(b(x)). \tag{48}$$

As described above, the secure distance calculator obtains the encrypted secure distance (Hamming distance) D corresponding to encryption of the secure distance between the first vector a and the second vector b from the first encrypted polynomial Enc(a(x)), the second encrypted polynomial Enc(b(x)) the first encrypted weight Enc(HW(a)) and the second encrypted weight Enc(HW(b)) Then, the secure distance calculator transmits only the Hamming distance D to the authentication station 70.

In a communication between the calculation server 30 and the authentication station 70, public key encryption is used, so that confidentiality of communication data is secured.

The secret key used at this time is assumed to be a matrix V represented by the equation (48)

$$V = \begin{bmatrix} v_0 & v_1 & v_2 & \ldots & v_{n-1} \\ -v_{n-1} & v_0 & v_1 & \ldots & v_{n-2} \\ -v_{n-2} & -v_{n-1} & v_0 & \ldots & v_{n-3} \\ \vdots & \vdots & \vdots & \ddots & \vdots \\ -v_1 & -v_2 & -v_3 & \ldots & v_0 \end{bmatrix} \tag{48}$$

with the use of the n-dimensional random number vector $v=(v_0, v_1, \ldots, v_{n-1})$ where absolute values of components are an integer of t bits or less for the preset dimensions n and bit length t. Additionally, the public key is assumed to be the matrix B, which is the Hermite normal form of the matrix V, the above described secret key.

The authentication station 70 includes a secret key 702, a decrypter 704, and a determinator 706.

As the secret key 702, the secret key V represented by the above provided equation (48) is stored.

The decrypter 704 decrypts the homomorphically encrypted Hamming distance D, which is transmitted from the calculation server 30, by using the secret key V. The Hamming distance D' obtained by decrypting the Hamming distance D is calculated as $$D' = D \bmod V = D \dagger D \times V^{-1} \rfloor \times V \qquad (49)$$

Thus, the decrypter 702 calculates the secure distance by decrypting the encrypted secure distance.

The determinator 706 makes a comparison between the decrypted Hamming distance D' and a prepared threshold value Dth. If D' is smaller than Dth, the determinator 706 determines that the characteristic quantity represented by the vector b is the same as the characteristic quantity represented by the vector a, and authenticates the user 80 as an authorized user. In this way, the determinator 706 determines whether or not a user is an authorized user based on a comparison made between the secure distance D' and the predetermined threshold value Dth.

Such a biometric authentication system uses n=512 as dimensions of a living body information vector in many cases, and needs 512 encrypted texts when individual bits are compared. In contrast, since only two encrypted texts are requested in this embodiment, the size of encrypted data can be reduced to 1/256.

Additionally, for the amount of time of the secure distance calculation, an encryption multiplication needs to be performed by 512 times since $$\sum_i (Enc(a_i) - Enc(b_i))^2 \qquad (50)$$

needs to be calculated when individual bits are compared. In contrast, only the operation of the equation (47) needs to be performed in this embodiment. Therefore, since the processing time of the encryption multiplication is long among encryption operation functions, and the secure distance can be calculated only with one encrypted multiplication. As a result, the processing speed can be made faster by approximately 512 times.

<Processes of the Biometric Authentication System>

Figure 3:
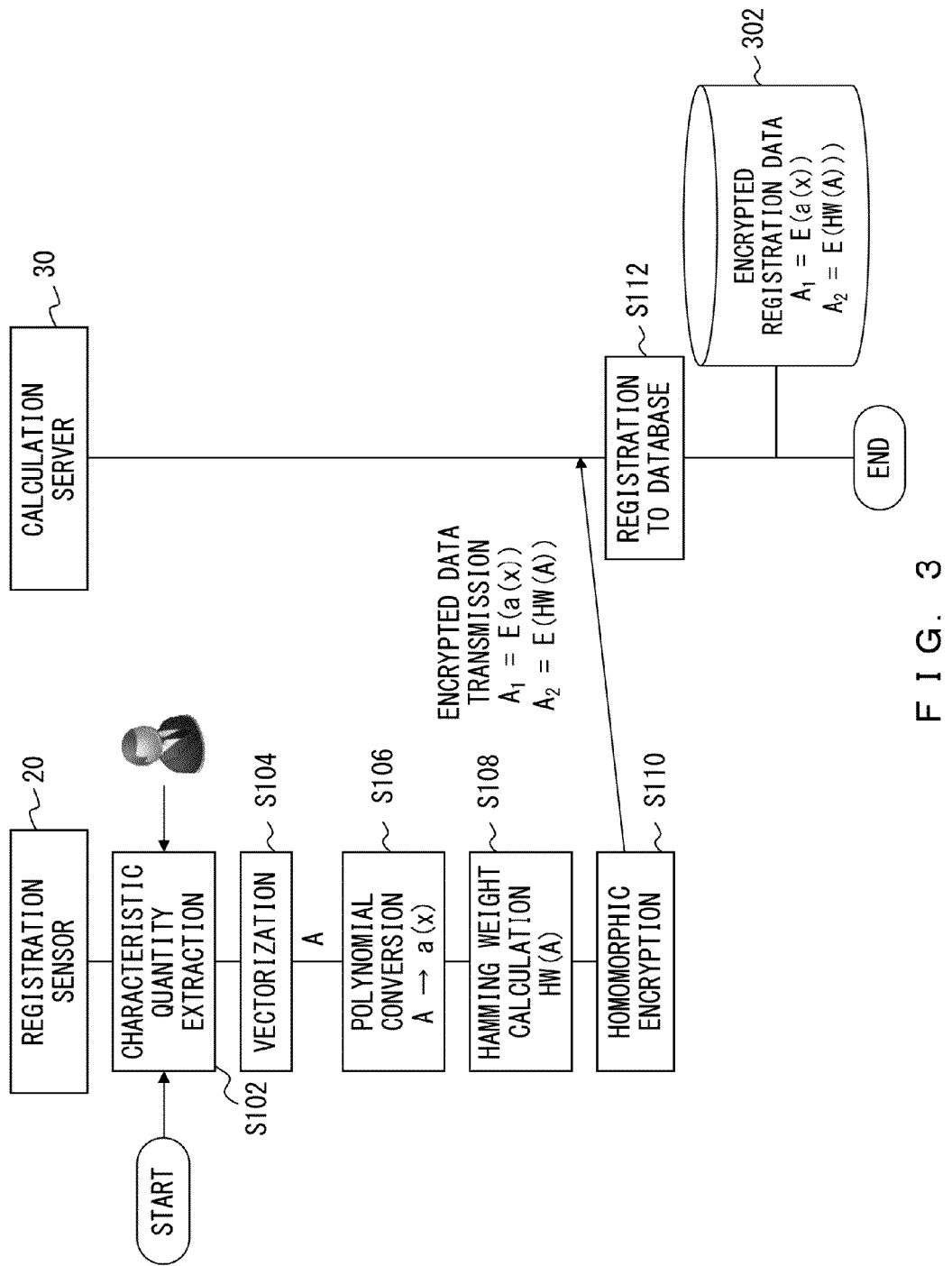
FIG. 3 illustrates an example of a process flow of the biometric authentication system using homomorphic encryption at the time of registration.

Examples of processes executed in the biometric authentication system are described with reference to FIGS. 3 and 4. FIG. 3 illustrates an example of a flow of the process of the biometric authentication system using homomorphic encryption at the time of registration.

Once the process is started, the registration sensor 20 obtains, from the sensor, part of information of the living body of the user 40 registered as an authorized user, and extracts a characteristic quantity in step S102. Then, the process proceeds to S104. This process may be executed by the characteristic quantity extractor 202 of the registration sensor 20.

In S104, the characteristic quantity extracted in S102 is represented as an n-dimensional vector a. This process may be executed by the vectorizer 204 of the registration sensor 20.

In the next S106, the n-dimensional vector a is converted into a polynomial. This process may be executed by the polynomial converter 206 of the registration sensor 20.

In S108 next to S106, the Hamming weight HW(a) for the n-dimensional vector a is calculated. This process may be executed by the Hamming weight calculator 208 of the registration sensor 20.

In the next S110, the polynomial a(x) obtained in S106 and the Hamming weight HW(a) obtained in S108 are encrypted, so that Enc(a(x)) and Enc(HW(a)) are obtained. These data Enc(a(x)) and Enc(HW(a)) are transmitted to the calculation server 30. The process of this step may be executed by the homomorphic encrypter 210 of the registration sensor 20.

In S112, Enc(a(x)) and Enc(HW(a)) are stored in a database, for example, as the encrypted registration data 302 of the calculation server 30.

Then, the registration process is terminated.

FIG. 4 illustrates an example of a flow of the process of the biometric authentication system using homomorphic encryption at the time of matching.

Once the process is started, the matching sensor 60 obtains, from the sensor, part of information of the living body of the user 80 to be authenticated, and extracts a characteristic quantity in step S202. Then, the process proceeds to step S204. This process may be executed by the characteristic quantity extractor 602 of the matching sensor 60.

In S204, the characteristic quantity extracted in S202 is represented as an n-dimensional vector b. This process may be executed by the vectorizer 604 of the matching sensor 60.

In the next S206, the n-dimensional vector a is converted into a polynomial. This process may be executed by the polynomial converter 606 of the registration sensor 20.

In S208 next to S206, the Hamming weight HW(b) for the n-dimensional vector a is calculated. This process may be executed by the Hamming weight calculator 608 of the matching sensor 60.

In the next S210, the polynomial b(x) obtained in S206 and the Hamming weight HW(b) obtained in S208 are encrypted, so that Enc(b(x)) and Enc(HW(b)) are obtained. These data Enc(b(x)) and Enc(HW(b)) are transmitted to the calculation server 30. The process of this step may be executed by the homomorphic encrypter 610 of the matching sensor 60.

In S212, a product Enc(b(x))×(Enc(HW(b)) of Enc(a(x)) stored as the encrypted registration data 302 and Enc(b(x)) obtained in S210 is calculated. This process may be executed by the encryption multiplication calculator 304 of the calculation server 30.

In S214, products $k_1$Enc(a(x)) and $k_2$Enc(b(x)) of the two integers $k_1$ and $k_2$ represented by the equation (44) and Enc (a(x)) and Enc(b(x)) are calculated. Moreover, in S214, a double 2Enc(b(x))×(Enc(HW(b)) of Enc(b(x))×(Enc(HW (b)) obtained in S210 is calculated. The process of this step may be executed by the encryption scalar calculator 306 of the calculation server 30.

In S216, a sum of $k_1$×(Enc(HW(a)), $k_2$×Enc(HW(b)), and 2×Enc(a(x))×(Enc(b(x)) is calculated, and the Hamming distance D represented by the equation (47) is calculated as a secure distance. Only the Hamming distance D is transmitted to the authentication station 70. The process of this step may be executed by the encryption addition calculator 308 of the calculation server 30.

In the next S218, the homomorphically encrypted Hamming distance D that is transmitted from the calculation server 30 is decrypted by using the secret key V represented by the equation (48). The secret key V may be stored as the encrypted registration data 702 of the authentication station 70. The process of this step may be executed by the decrypter 704 of the authentication station 70.

In S220, the decrypted Hamming distance D' is compared with the prepared threshold value dth. If D' is smaller than dth, it is determined that the characteristic quantity represented by the vector b is the same as that represented by the vector a, and the user 80 is authenticated as an authorized user. The process of this step may be executed by the determinator 706 of the authentication station 70.

In S222, a result of S220 is output. This process may be executed by a display device not illustrated.

Here, the matching process is terminated.

Second Embodiment

A tag search system as an example of the encryption processing apparatus using the above described ideal-lattice-based fully homomorphic encryption is described with reference to FIGS. 5A to 8.

The tag search system is a system for quickly making a search by attaching an associated tag to a material such as a photograph or a document when the photograph or the document is stored in a cloud storage. The photograph or the document stored in the cloud storage is sometimes associated with a job, or a private one of a trip or the like. Therefore, such data is highly confidential in some cases.

As illustrated in FIG. 5A, when a user saves data, he or she vectorizes a tag in a personal coMPUter (PC) possessed by the user himself, and creates encrypted data by making the vectorized tag confidential with homomorphic encryption. Then, the user saves only the encrypted data in a cloud database.

As illustrated in FIG. 5B, when user searches for a tag, the user vectorizes a searched tag in the PC, and transmits only data obtained by making the vectorized tag confidential with homomorphic encryption to the cloud. Within the cloud, a secure distance between two data are calculated while leaving distances of two homomorphically encrypted vectors unchanged, and only a result of the secure distance calculation is returned to the user PC. Lastly, the user PC decrypts the result of the secure distance calculation by using the secret key, and determines whether or not the two vector data are similar.

<Configuration of the Tag Search System>

The tag search system illustrated in FIGS. 5A and 5B is described in detail with reference to FIGS. 6A and 6B.

Figure 6A:
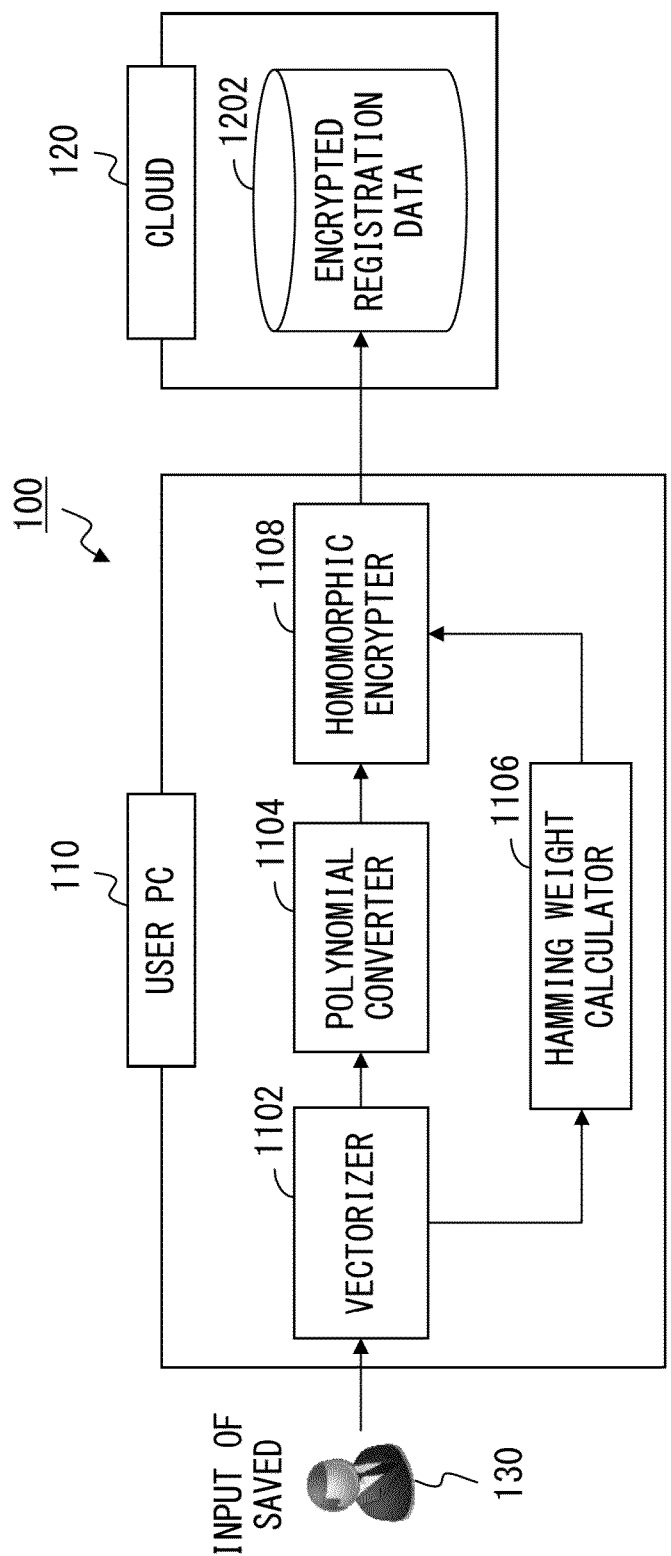
FIG. 6A is a block diagram illustrating an example of a configuration of the tag search system using homomorphic encryption at the time of saving.

FIG. 6A is a block diagram illustrating the tag search system 100, which is an example of the configuration the tag search system using homomorphic encryption at the time of saving.

The tag search system 100 includes a user PC 110 and a cloud 120. The user PC 110 includes a vectorizer 1102, a polynomial converter 1104, a Hamming weight calculator 1106, and a homomorphic encrypter 1108. These components are sometimes referred to as the first vectorizer 1102, the first polynomial converter 1104, the first Hamming weight calculator 1106, and the first homomorphic encrypter 1108. Moreover, the first Hamming weight calculator 1106 is sometimes referred to simply as the weight calculator 1106.

The cloud 120 includes encrypted registration data 1202 where text data is stored as a tag. As illustrated in FIG. 6B, the cloud 120 includes an encryption multiplication calculator 1204 for performing a multiplication operation of two homomorphically encrypted data, an encryption scalar calculator 1206 for performing a calculation of a scalar multiple of homomorphically encrypted data, and an encryption addition calculator 1208 for performing an addition operation of two homomorphically encrypted data although these components are not illustrated in FIG. 6A.

The encryption multiplication calculator 1204, the encryption scalar calculator 1206, and the encryption addition calculator 1208 are combined, so that a secure distance calculator is configured.

The vectorizer 1102 represents input text data as an n-dimensional vector a. For example, the vector a is represented as $$a = (a_0, a_1, \ldots, a_{n-1}), \quad (51)$$

when $a_0, \ldots, a_{n-1}$ are assumed to be 0 or 1. Preferably, the text data is a text that can be a keyword. For example, if the text data is associated with a job, it may be a project name, a date, or the like. Alternatively, if the text data is associated with a private trip, it may be a destination name, a date, or the like. Further alternatively, if the text data is a growth record of a child, it may be a combination of a name and a date. As described above, the first vectorizer 1104 represents input (first) text data as the first vector a.

The polynomial converter 1106 converts the vector a obtained by the vectorizer 1104 into a polynomial. For example, a conversion polynomial $$a(x) = \sum_{i=0}^{n-1} a_i x^{i-1} \quad (52)$$

is calculated. Thus, the (first) polynomial converter 1106 obtains the first polynomial a(x) from the first vector a by using the first conversion polynomial.

The Hamming weight calculator 1108 calculates the Hamming weight HW(a) of the vector a. In this case, the Hamming weight HW(a) is $$HW(a) = \sum_{i=0}^{n-1} a_i. \quad (53)$$

Thus, the (first) weight calculator 1108 calculates the first weight HW(a) for the secure distance of the first vector a. In this case, the secure distance is the Hamming distance, and the first weight is the Hamming weight.

The homomorphic encrypter 1110 obtains Enc(a(x))

$$Enc(a(x)) = \left[ a(r) + s \times \sum_{i=0}^{n-1} u_i \times r^{i-1} \right]_d \quad (54)$$

and
Enc(HW(a))

$$Enc(HW(a)) = \left[ HW(a(r)) + s \times \sum_{i=0}^{n-1} u_i \times r^{i-1} \right]_d \quad (55)$$

by encrypting the polynomial a(x) obtained by the polynomial converter 1106 and the Hamming weight HW(a) obtained by the Hamming weight calculator 1108. Thus, the (first) homomorphic encrypter 1110 obtains the first encrypted polynomial Enc(a(x)) and the first encrypted weight Enc(HW(a)) by respectively encrypting the first polynomial a(x) and the first weight HW(a) with the use of the homomorphic encryption scheme.

The encrypted data Enc(a(x)) and Enc(HW(a)), which are obtained by the homomorphic encrypter 1110, are transmitted to the cloud 120, and stored as the encrypted registration data 1202.

FIG. 6B is a block diagram illustrating the tag search system 150, which is an example of the configuration of the tag search system using homomorphic encryption at the time of a search.

The tag search system 150 includes a user PC 160 and the cloud 120. The user PC 160 includes a vectorizer 1602, a polynomial converter 1604, a Hamming weight calculator 1606, and a homomorphic encrypter 1608. These components respectively have configurations identical or similar to those of the vectorizer 1102, the polynomial converter 1104, the Hamming weight calculator 1106, and the homomorphic encrypter 1108 of the user PC 110. Moreover, the user PC 160 includes a decrypter 1610, and a secret key storage 1612 for storing a secret key of the public key cryptosystem. Moreover, these components are sometimes referred to as the second vectorizer 1602, the second polynomial converter 1604, the second Hamming weight calculator 1606, and the second homomorphic encrypter 1608. The first vectorizer 1102, the first polynomial converter 1104, the first Hamming weight calculator 1106, and the first homomorphic encrypter 1108 are sometimes used without being distinguished from the second vectorizer 1602, the second polynomial converter 1604, the second Hamming weight calculator 1606, and the second homomorphic encrypter 1608. Additionally, the second Hamming weight calculator 1606 is sometimes referred to simply as the weight calculator 1606.

The vectorizer 1602 represents text data input by a user as an n-dimensional vector b. For example, the vector b is represented as $$b=(b_0,b_1,\ldots,b_{n-1}) \tag{56}$$

when $b_0, \ldots, b_{n-1}$ are assumed to be 0 or 1. Thus, the second vectorizer 1602 represents (second) text data input by a user as the first vector b.

The polynomial converter 1604 converts the vector b obtained by the vectorizer 1602 into a polynomial. For example, a conversion polynomial $$b(x) = \sum_{j=0}^{n-1} b_j x^{n-j+1} \tag{57}$$

is calculated. Note that the conversion polynomial b(x) at the time of a search is different from the conversion polynomial a(x) at the time of saving. Thus, the (second) polynomial converter 1604 obtains the second polynomial b(x) from the second vector b by using the second conversion polynomial.

The Hamming weight calculator 1606 calculates the Hamming weight HW(b) of the vector b. In this case, the Hamming weight HW(b) is $$HW(b) = \sum_{i=0}^{n-1} b_i. \tag{58}$$

Thus, the (second) weight calculator 1606 calculates the second weight HW(b) for the secure distance of the second vector b. In this case, the secure distance is the Hamming distance, and the second weight is the Hamming weight.

The polynomial obtained by the polynomial converter 1604 and the Hamming weight HW(b) obtained by the Hamming weight calculator 1606 are encrypted by the homomorphic encrypter 1608, so that Enc(b(x)) and Enc(HW(b)) are obtained. Thus, the (second) homomorphic encrypter 1608 obtains the second encrypted polynomial Enc(b(x)) and the second encrypted weight Enc(HW(b)) by respectively encrypting the second polynomial b(x) and the second weight HW(b) with the use of the homomorphic encryption scheme.

The encrypted data Enc(b(x)) and Enc(HW(b)), which are obtained by the homomorphic encrypter 1608, are transmitted to the cloud 120. Enc(b(x)) and Enc(HW(b)) are respectively obtained by replacing a(x) with b(x) in the above provided equations (57) and (58).

The encryption multiplication calculator 1204 of the cloud 120 calculates a product of Enc(a(x)) stored as the encrypted registration data 1202 and Enc(b(x)) obtained by the homomorphic encrypter 1608:

$$C_1=\text{Enc}(a(x)) \times \text{Enc}(b(x)) \tag{59}$$

The encryption scalar calculator 1206 calculates products of two integers calculated in advance and Enc(a(x)) and Enc(b(x)):

$$k_1 \times Enc(a(x)), \tag{60a}$$

$$k_2 \times Enc(b(x)), \tag{60b}$$

where $$k_1 = \left[-\sum_i r^{n-i}\right]_d, \tag{61a}$$

$$k_2 = \left[-\sum_j r^j\right]_d. \tag{61b}$$

Moreover, the encryption scalar calculator 1206 calculates a double of $C_1$ obtained by the encryption multiplication calculator 1204:

$$2 \times C_1 = 2 \times \text{Enc}(a(x)) \times \text{Enc}(b(x)). \tag{62}$$

The encryption addition calculator 1208 calculates a sum of $k_1 \times$Enc(HW(a)), $k_2 \times$Enc(HW(b)), and $2 \times$Enc(a(x))$\times$Enc(b(x)), and calculates, as a secure distance, the Hamming distance D represented by the following equation.

$$D=k_1 \times \text{Enc}(a(x))+k_2 \times \text{Enc}(b(x))+2 \times \text{Enc}(a(x)) \times \text{Enc}(b(x)) \tag{63}$$

Thus, the secure distance calculator obtains an encrypted secure distance (Hamming distance) D corresponding to the encryption of the secure distance between the first vector a and the second vector b from the first encrypted polynomial Enc(a(x)), the second encrypted polynomial Enc(b(x)), the first encrypted weight Enc(HW(a)), and the second encrypted weight Enc(HW(b)). Then, the secure distance calculator transmits only the Hamming distance D to the user PC 160.

In a communication between the user PC 160 and the cloud 120, public key cryptosystem is used, so that confidentially of communication data is secured.

The secret key used at this time is assumed to be a matrix V represented by the equation (64) with the use of an n-dimensional random number vector $v=(v_0, v_1, \ldots, v_{n-1})$ where absolute values of the components are an integer of t bits or less for the preset dimensions n and bit length t.

$$V = \begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix} \quad (64)$$

Additionally, the public key is assumed to be the matrix B, which is the Hermite normal form of the matrix V, the above described secret key.

As the secret key 1612, the secret key V represented by the above provided equation (64) is stored.

The decrypter 1610 decrypts the homomorphically encrypted Hamming distance D that is transmitted from the cloud 120 by using the secret key V. A Hamming distance D' obtained by decrypting the Hamming distance D is calculated as $$D' = D \bmod V = D \lfloor D \times V^{-1} \rfloor \times V \quad (65)$$

The decrypter 1606 calculates the secure distance D' as the degree of similarity by decrypting the encrypted secure distance D. Then, the Hamming distance D' is output as the degree of similarity.

The decrypter 1610 may also make a comparison between the decrypted Hamming distance D' and a prepared threshold value Dth. If D' is smaller than Dth, it is determined that the two text data are the same.

<Processes of the Tag Search System>

Figure 7:
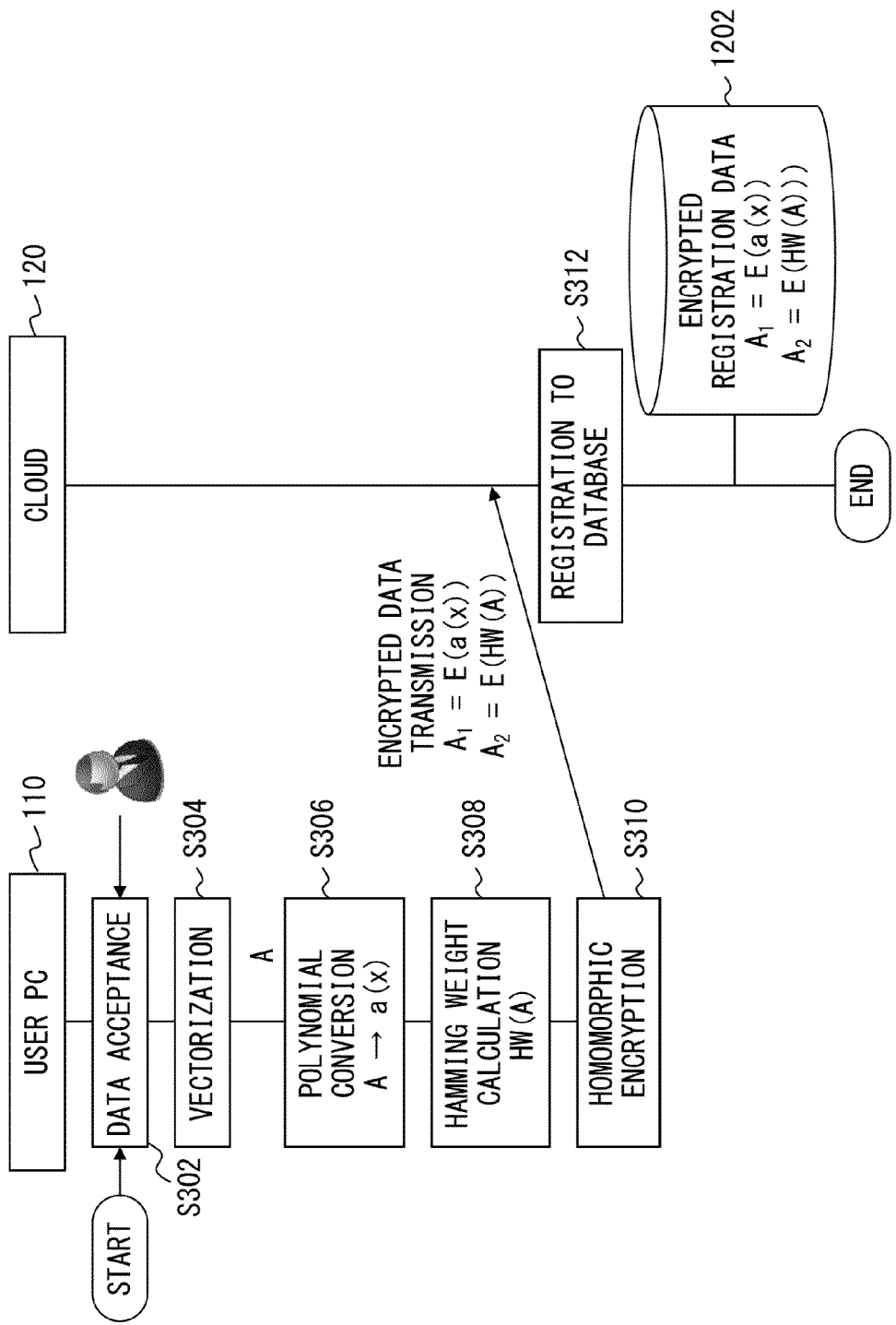
FIG. 7 illustrates an example of a process flow of the tag search system using homomorphic encryption at the time of saving.

Examples of processes executed in the tag search system are described with reference to FIGS. 7 and 8. FIG. 7 illustrates an example of a flow of the process of the tag search system using homomorphic encryption at the time of saving.

Once the process is started, the user PC 110 accepts an input of text data in S302. Then, the process proceeds to S304.

In S304, the text data input in S302 is represented as an n-dimensional vector a. This process may be executed by the vectorizer 1102 of the user PC 110.

In the next S306, the n-dimensional vector a is converted into a polynomial. This process may be executed by the polynomial converter 1104 of the user PC 110.

In S308 next to S306, the Hamming weight HW(a) for the n-dimensional vector a is calculated. This process may be executed by the Hamming weight calculator 1106 of the user PC 110.

In the next S310, the polynomial a(x) obtained in S306 and the Hamming weight HW(a) obtained in S108 are encrypted, so that Enc(a(x)) and Enc(HW(a)) are obtained. These data Enc(a(x)) and Enc(HW(a)) are transmitted to the cloud 120. The process of this step may be executed by the homormorphic encrypter 1108 of the user PC 110.

In S312, Enc(a(x)) and Enc(HW(a)) are stored in a database, for example, as encrypted registration data 1202 of the cloud 120.

Here, the registration process is terminated.

Figure 8:
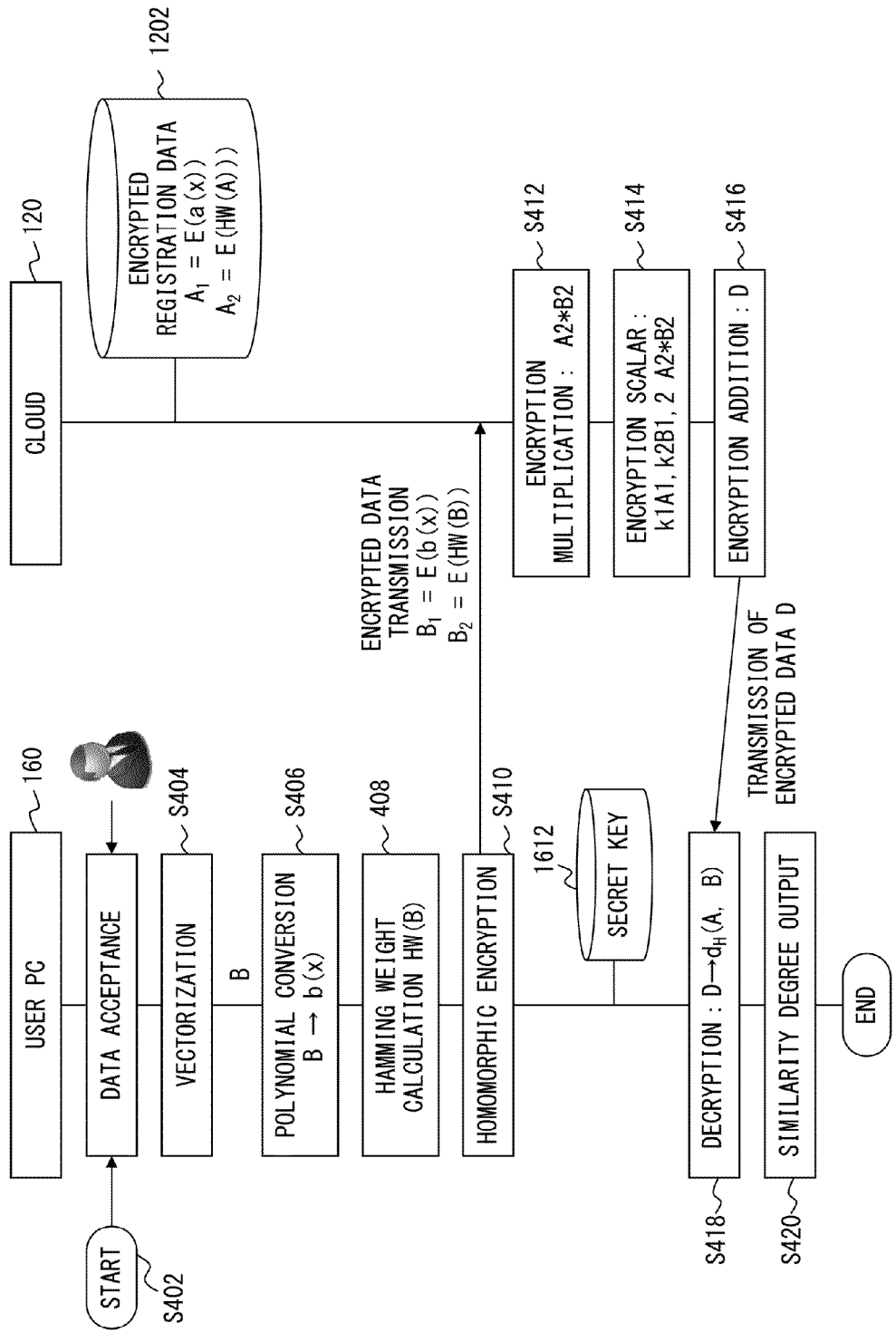
FIG. 8 illustrates an example of a process flow of the tag search system using homomorphic encryption at the time of a search.

FIG. 8 illustrates an example of the flow of the process of the biometric authentication system using homomorphic encryption at the time of a search.

Once the process is started, the user PC 160 accepts an input of text data in S402. Then, the process proceeds to S404.

In S404, the text data input in S402 is represented as an n-dimensional vector b. This process may be executed by the vectorizer 1602 of the user PC 160.

In the next S406, the n-dimensional vector a is converted into a polynomial. This process may be executed by the polynomial converter 1604 of the user PC 160.

In S408 next to S406, the Hamming weight HW(b) for the n-dimensional vector a is calculated. This process may be executed by the Hamming weight calculator 1606 of the user PC 160.

In the next S410, the polynomial b(x) obtained in S406 and the Hamming weight HW(b) obtained in S408 are encrypted, so that Enc(b(x)) and Enc(HW(b)) are obtained. Then, these data Enc(b(x)) and Enc(HW(b)) are transmitted to the cloud 120. The process of this step may be executed by the homomorphic encrypter 1608 of the user PC 160.

In S412, a product Enc(b(x))×Enc(HW(b)) of Enc(a(x)) stored as the encrypted registration data 1202 and Enc(b(x)) obtained in S410 is calculated. This process may be executed by the encryption multiplication calculator 1204 of the cloud 120.

In S414, products $k_1$Enc(a(x))) and $k_2$Enc(b(x)) of the two integers $k_1$ and $k_2$ in the equation (61), and Enc(a(x)) and Enc(b(x)) are calculated. Moreover, in S414, a double 2Enc (b(x))×Enc(HW(b)) of Enc(b(x))×Enc(HW(b)), which are obtained in S410, is calculated. The process of this step may be executed by the encryption scalar calculator 1206 of the cloud 120.

In S416, a sum of $k_2$×Enc(HW(a)), $k_2$×Enc(HW(b)), and 2×Enc(a(x))×Enc(b(x)) is calculated, and the Hamming distance D represented by the equation (60) is calculated as a secure distance. Then, only the Hamming distance D is transmitted to the user PC 160. The process of this step may be executed by the encryption addition calculator 1208 of the cloud 120.

In the next S418, the homomorphically encrypted Hamming distance D that is transmitted from the cloud 120 is decrypted by using the secret key V represented by the equation (64). The secret key V may be stored as the encrypted registration data 1212 of the user PC 160. The process of this step may be executed by the decrypter 1610 of the user PC 160.

In S420, a result of S418 is output as the degree of similarity. This process may be executed by a display device not illustrated.

Here, the matching process is terminated.

Figure 9:
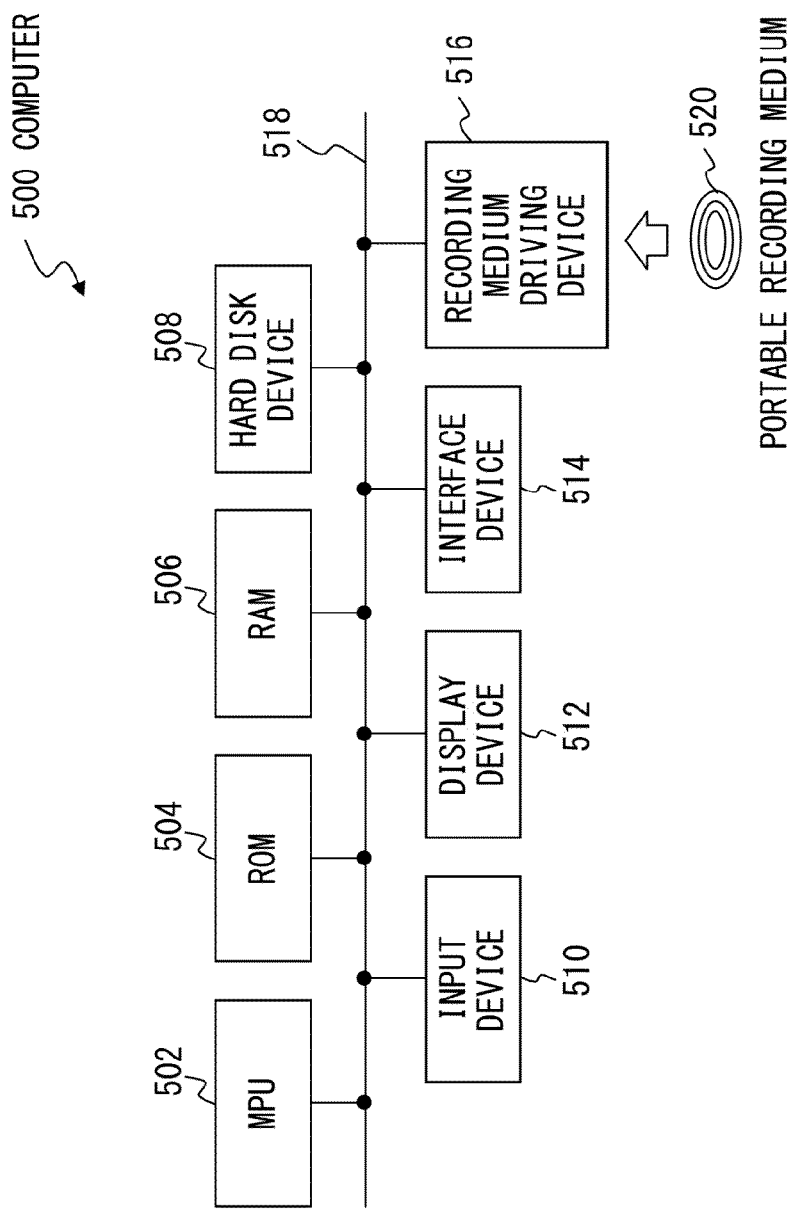
FIG. 9 is a configuration diagram illustrating an example of a configuration of an encryption processing apparatus using homomorphic encryption.

FIG. 9 illustrates an example of a configuration of the encryption processing apparatus using homomorphic encryption. The homomorphic encryption apparatus may be implemented as a general-purpose coMPUter 500.

This computer 500 includes an MPU 502, a ROM 504, a RAM 506, a hard disk device 508, an input device 510, a display device 512, an interface device 514, and a recording medium driving device 516. These components are interconnected by a bus line 520, and can mutually transmit and receive various types of data under the control of the MPU 502.

The MPU (Micro Central Processing Unit) 502 is an arithmetic processing device for controlling operations of the entire computer 500, and functions as a control processing unit of the computer 500.

The ROM (Read Only Memory) 504 is a semiconductor memory which is dedicated to read operations, and in which a specified basic control program is prerecorded. The MPU 502 reads and executes the basic control program at startup of the computer 500, so that operations of the components of the computer 500 can be controlled.

The RAM (Random Access Memory) 506 is a semiconductor memory, which is used as a working storage area if desired when the MPU 502 executes various types of control programs, and to/from which a write/read can be performed on demand.

The hard disk device 508 is a storage device for storing various types of control programs executed by the MPU 502, and various types of data. The MPU 502 reads and executes a specified control program stored on the hard disk device 508, so that various types of control processes to be described later can be executed.

The input device 510 is, for example, a mouse device or a keyboard device. When the input device 510 is operated by a user of the system illustrated in FIG. 6, the input device 510 obtains an input of each type of information, which corresponds to content of the operation, and transmits the obtained input information to the MPU 502.

The display device 512 is, for example, a liquid crystal display, and displays various types of texts and images according to display data transmitted from the MPU 502.

The interface device 514 manages transmissions and receptions of various types of information among various types of devices connected to the computer 500.

The recording medium driving device 516 is a device for reading various types of control programs and data recorded on a portable recording medium 520. The MPU 501 may execute the various types of control processes to be described later by reading and executing a specified control program recorded on the portable recording medium 520 via the recording medium driving device 516. Examples of the portable recording medium 520 include a flash memory provided with a USB (Universal Serial Bus) connector, a CD-ROM (Compact Disc-Read Only Memory), and a DVD-ROM (Digital Versatile Disc-Read Only Memory).

To configure the encryption processing apparatus by using such a computer 500, for example, a control program for causing the MPU 502 to execute the processes in the above described processing units is created. The created control program is prestored on the hard disk device 508 or the portable recording medium 520. Then, a specified instruction is issued to the MPU 502 such that the MPU 502 is caused to read and execute the control program. Thus, the functions possessed by the encryption processing apparatus are provided by the MPU 502.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encryption processing apparatus functioning as a biometric authentication apparatus, the encryption processing apparatus comprising
a processor configured to:
extract, as a first characteristic quantity, a characteristic for distinguishing an authorized user from other users from information relating to part of a living body of the authorized user;
extract a second characteristic quantity to be compared with the first characteristic quantity of the authorized user from information relating to part of a living body of a user to be authenticated as the authorized user;
represent the first characteristic quantity as a first vector;
represent the second characteristic quantity as a second vector;
obtain a first polynomial from the first vector by using a first conversion polynomial;
obtain a second polynomial from the second vector by using a second conversion polynomial;
obtain a first weight for a secure distance of the first vector;
obtain a second weight for a secure distance of the second vector;
obtain a first encrypted polynomial, a second encrypted polynomial, a first encrypted weight, and a second encrypted weight by respectively encrypting the first polynomial, the second polynomial, the first weight, and the second weight by using the homomorphic encryption scheme;
obtain an encrypted secure distance corresponding to encryption of a secure distance between the first vector and the second vector, the encrypted secure distance being obtained from the first encrypted polynomial, the second encrypted polynomial, the first encrypted weight, and the second encrypted weight;
calculate the secure distance by decrypting the encrypted secure distance; and
determine whether or not the user to be authenticated as the authorized user is the authorized user based on a comparison made between the secure distance and a predetermined threshold value.

2. The apparatus according to claim 1, wherein the weight is a Hamming weight, and the secure distance is a Hamming distance.

3. The apparatus according to claim 1, wherein the first conversion polynomial is defined by $$a(x) = \sum_{i=1}^{n} a_i x^{i-1}$$

or $$a(x) = \sum_{j=1}^{n} a_j x^{n-j+1}$$

for a vector $(a_1, a_2, \ldots, a_n)$, and the second conversion polynomial is defined by the other of the two equations one of which defines the first conversion polynomial.

4. The apparatus according to claim 3, wherein the first encrypted polynomial, the second encrypted polynomial, the first encrypted weight or the second encrypted weight is represented by $$Enc(a(x)) = \left[ a(r) + s \times \sum_{i=0}^{n-1} u_i \times r^{i-1} \right]_d,$$

when the first conversion polynomial, the second conversion polynomial, the first encrypted weight or the second encrypted weight is assumed to be $a(x)$, d is assumed to be a (1,1) component of a matrix B that represents a public key, and r is assumed to be a (2,1) component of the matrix B that represents the public key based on the assumption that $$[x]_d = x \bmod d$$

is defined for an integer x and d, and the secure distance is represented by $$C_1 \times Enc(a(x)) + C_2 \times Enc(b(x)) + 2 Enc(a(x)) \times Enc(b(x))$$

when the first vector and the second vector are respectively assumed to be $$A=(a_1,a_2,\ldots,a_n) \text{ and } B=(b_1,b_2,\ldots,b_n), \text{ and}$$

$$C_1 = \left[-\sum_{i=1}^{n} r^{n-i+1}\right]_d$$

$$C_2 = \left[-\sum_{j=1}^{n} r^{j-1}\right]_d$$

are assumed.

5. The apparatus according to claim 1, wherein the first conversion polynomial is defined by $$a(x) = \sum_{i=1}^{n} a_i x^{i-1}$$

or $$b'(x) = -\sum_{j=1}^{n} b_j x^{n-j+1}$$

for the vector $(a_1, a_2, \ldots, a_n)$, and the second conversion polynomial is defined by the other of the above equations, one of which defines the first conversion polynomial.

6. The apparatus according to claim 5, wherein the first encrypted polynomial, the second encrypted polynomial, the first encrypted weight, or the second encrypted weight is defined by $$Enc(a(x)) = \left[a(r) + s \times \sum_{i=0}^{n-1} u_i \times r^{i-1}\right]_d,$$

when the first conversion polynomial, the second conversion polynomial, the first encrypted weight, or the second encrypted weight is assumed to be a(x), d is assumed to be a (1,1) component of a matrix B that represents a public key, r is assumed to be a (2,1) component of the matrix B that represents the public key based on the assumption that $$[x]_d = x \bmod d$$

is defined for an integer x and d, and the secure distance is represented by $$d = C_1 \times Enc(a(x)) + C_2' \times Enc(b'(x)) - 2Enc(a(x)) \times Enc(b'(x))$$

or $$d = C_2(-Enc(a(x)) + Enc(b'(x))) + 2Enc(a(x)) \times (1 - Enc(b'(x)))$$

when the first vector and the second vector are respectively assumed to be $$A=(a_1,a_2,\ldots,a_n) \text{ and } B=(b_1,b_2,\ldots,b_n), \text{ and}$$

$$C_1 = \left[-\sum_{i=1}^{n} r^{n-i}\right]_d$$

-continued $$C_2' = -\left[\sum_{j=1}^{n} r^{j-1}\right]_d$$

are assumed.

7. The apparatus according to claim 1, wherein
in the homomorphic encryption scheme, when a vector u is assumed to be a vector of the same dimensions as a plaintext b, which includes components of 0 or 1, and a vector e1 is assumed to be a vector where only a first component is 1 and all the other components are 0, an encrypted text c of the plaintext b is given by $$c=(2u+b \times e_1) \bmod B,$$

where B is an Hermite normal form of $$V = \begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix}$$

based the assumption that an n-dimensional random number vector $v=(v_0, v_1, \ldots, v_{n-1})$ where absolute values of components are an integer of t bits or less is assumed for dimensions n and a specified bit length t when the plaintext is displayed as a vector.

8. An encryption processing method used for a biometric authentication, the encryption processing method comprising:
extracting, as a first characteristic quantity, a characteristic for distinguishing an authorized user from other users from information relating to part of a living body of the authorized user;
extracting a second characteristic quantity to be compared with the first characteristic quantity of the authorized user from information relating to part of a living body of a user to be authenticated as the authorized user;
representing the first characteristic quantity as a first vector;
representing the second characteristic quantity as a second vector;
obtaining a first polynomial from the first vector by using a first conversion polynomial;
obtaining a second polynomial from the second vector by using a second conversion polynomial;
obtaining a first weight for a secure distance of the first vector;
obtaining a second weight for a secure distance of the second vector;
obtaining a first encrypted polynomial, a second encrypted polynomial, a first encrypted weight, and a second encrypted weight by respectively encrypting the first polynomial, the second polynomial, the first weight, and the second weight by using the homomorphic encryption scheme;
obtaining an encrypted secure distance corresponding to encryption of a secure distance between the first vector and the second vector, the encrypted secure distance being obtained from the first encrypted polynomial, the second encrypted polynomial, the first encrypted weight, and the second encrypted weight;

calculating the secure distance by decrypting the encrypted secure distance; and determining whether or not the user to be authenticated as the authorized user is the authorized user based on a comparison made between the secure distance and a predetermined threshold value.

9. An encryption processing apparatus functioning as a tag search apparatus, the encryption processing apparatus comprising a processor configured to:
represent, as a first vector, first text data attached to confidential information as a tag;
represent, as a second vector, second text data used to search for the confidential information;
obtain a first polynomial from the first vector by using a first conversion polynomial;
obtain a second polynomial from the second vector by using a second conversion polynomial;
obtain a first weight for a secure distance of the first vector;
obtain a second weight for a secure distance of the second vector;
obtain a first encrypted polynomial, a second encrypted polynomial, a first encrypted weight, and a second encrypted weight by respectively encrypting the first polynomial, the second polynomial, the first weight, and the second weight by using the homomorphic encryption scheme;
obtain an encrypted secure distance corresponding to encryption of a secure distance between the first vector and the second vector, the encrypted secure distance being obtained from the first encrypted polynomial, the second encrypted polynomial, the first encrypted weight, and the second encrypted weight; and
calculate the secure distance as a degree of similarity by decrypting the encrypted secure distance.

10. The apparatus according to claim 9, wherein the weight is a Hamming weight, and the secure distance is a Hamming distance.

11. The apparatus according to claim 9, wherein the first conversion polynomial is defined by $$a(x) = \sum_{i=1}^{n} a_i x^{i-1}$$

or $$a(x) = \sum_{j=1}^{n} a_j x^{n-j+1}$$

for a vector $(a_1, a_2, \ldots, a_n)$, and the second conversion polynomial is defined by the other of the two equations one of which defines the first conversion polynomial.

12. The apparatus according to claim 11, wherein the first encrypted polynomial, the second encrypted polynomial, the first encrypted weight or the second encrypted weight is represented by $$Enc(a(x)) = \left[ a(r) + s \times \sum_{i=0}^{n-1} u_i \times r^{i-1} \right]_d,$$

when the first conversion polynomial, the second conversion polynomial, the first encrypted weight or the second encrypted weight is assumed to be a(x), d is assumed to be a (1,1) component of a matrix B that represents a public key, and r is assumed to be a (2,1) component of the matrix B that represents the public key based on the assumption that $$[x]_d = x \bmod d$$

is defined for an integer x and d, and the secure distance is represented by $$C_1 \times Enc(a(x)) + C_2 \times Enc(b(x)) + 2Enc(a(x)) \times Enc(b(x))$$

when the first vector and the second vector are respectively assumed to be $$A=(a_1, a_2, \ldots, a_n) \text{ and } B=(b_1, b_2, \ldots, b_n), \text{ and}$$

$$C_1 = \left[ -\sum_{i=1}^{n} r^{n-i+1} \right]_d$$

$$C_2 = \left[ -\sum_{j=1}^{n} r^{j-1} \right]_d$$

are assumed.

13. The apparatus according to claim 9, wherein the first conversion polynomial is defined by $$a(x) = \sum_{i=1}^{n} a_i x^{i-1}$$

or $$b'(x) = -\sum_{j=1}^{n} b_j x^{n-j+1}$$

for the vector $(a_1, a_2, \ldots, a_n)$, and the second conversion polynomial is defined by the other of the above equations, one of which defines the first conversion polynomial.

14. The apparatus according to claim 13, wherein the first encrypted polynomial, the second encrypted polynomial, the first encrypted weight, or the second encrypted weight is defined by $$Enc(a(x)) = \left[ a(r) + s \times \sum_{i=0}^{n-1} u_i \times r^{i-1} \right]_d,$$

when the first conversion polynomial, the second conversion polynomial, the first encrypted weight, or the second encrypted weight is assumed to be a(x), d is assumed to be a (1,1) component of a matrix B that represents a public key, r is assumed to be a (2,1) component of the matrix B that represents the public key based on the assumption that $$[x]_d = x \bmod d$$

is defined for an integer x and d, and the secure distance is represented by $$d = C_1 \times Enc(a(x)) + C_2' \times Enc(b'(x)) - 2Enc(a(x)) \times Enc(b'(x))$$

or $$d = C_2(-Enc(a(x)) + Enc(b'(x))) + 2Enc(a(x)) \times (1 - Enc(b'(x)))$$

when the first vector and the second vector are respectively assumed to be $$A=(a_1,a_2,\ldots,a_n) \text{ and } B=(b_1,b_2,\ldots,b_n), \text{ and}$$

$$C_1 = \left[-\sum_{i=1}^{n} r^{n-i}\right]_d$$

$$C'_2 = \left[-\sum_{j=1}^{n} r^{j-1}\right]_d$$

are assumed.

15. The apparatus according to claim 9, wherein
in the homomorphic encryption scheme, when a vector u is assumed to be a vector of the same dimensions as a plaintext b, which includes components of 0 or 1, and a vector e1 is assumed to be a vector where only a first component is 1 and all the other components are 0, an encrypted text c of the plaintext b is given by $$c=(2u+b\times e_1) \bmod B,$$

where B is an Hermite normal form of $$V = \begin{bmatrix} v_0 & v_1 & v_2 & \cdots & v_{n-1} \\ -v_{n-1} & v_0 & v_1 & \cdots & v_{n-2} \\ -v_{n-2} & -v_{n-1} & v_0 & \cdots & v_{n-3} \\ \vdots & \vdots & \vdots & \ddots & \vdots \\ -v_1 & -v_2 & -v_3 & \cdots & v_0 \end{bmatrix}$$

based the assumption that an n-dimensional random number vector $v=(v_0,v_1,\ldots,v_{n-1})$ where absolute values of components are an integer of t bits or less is assumed for dimensions n and a specified bit length t when the plaintext is displayed as a vector.

16. An encryption processing method used for a tag search, the encryption processing method comprising:
representing, as a first vector, first text data attached to confidential information as a tag;
representing, as a second vector, second text data used to search for the confidential information;
obtaining a first polynomial from the first vector by using a first conversion polynomial;
obtaining a second polynomial from the second vector by using a second conversion polynomial;
obtaining a first weight for a secure distance of the first vector;
obtaining a second weight for a secure distance of the second vector;
obtaining a first encrypted polynomial, a second encrypted polynomial, a first encrypted weight, and a second encrypted weight by respectively encrypting the first polynomial, the second polynomial, the first weight, and the second weight by using the homomorphic encryption scheme;
obtaining an encrypted secure distance corresponding to encryption of a secure distance between the first vector and the second vector, the encrypted secure distance being obtained from the first encrypted polynomial, the second encrypted polynomial, the first encrypted weight, and the second encrypted weight; and
calculating the secure distance as a degree of similarity by decrypting the encrypted secure distance.

\* \* \* \* \*